(12) United States Patent
Woo et al.

(10) Patent No.: US 10,911,915 B2
(45) Date of Patent: Feb. 2, 2021

(54) DEVICE AND METHOD FOR PROVIDING V2P SERVICE ON BASIS OF PROXIMITY-BASED SERVICE DIRECT COMMUNICATION

(71) Applicant: Samsung Electronics Co., Ltd, Suwon-si (KR)

(72) Inventors: Jun-Young Woo, Hwaseong-si (KR);
Seung-Jin Kim, Seongnam-si (KR);
Song-Yean Cho, Seoul (KR);
Chae-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/347,491

(22) PCT Filed: Nov. 3, 2017

(86) PCT No.: PCT/KR2017/012399
§ 371 (c)(1),
(2) Date: May 3, 2019

(87) PCT Pub. No.: WO2018/084629
PCT Pub. Date: May 11, 2018

(65) Prior Publication Data
US 2020/0059767 A1    Feb. 20, 2020

(30) Foreign Application Priority Data
Nov. 3, 2016   (KR) ......................... 10-2016-0145954

(51) Int. Cl.
*H04W 4/40*    (2018.01)
*H04W 4/50*    (2018.01)
(Continued)

(52) U.S. Cl.
CPC ......... *H04W 4/40* (2018.02); *H04M 1/72522* (2013.01); *H04W 4/023* (2013.01);
(Continued)

(58) Field of Classification Search
CPC ...................................................... H04W 4/40
See application file for complete search history.

(56) References Cited

U.S. PATENT DOCUMENTS 9,191,897 B2   11/2015   Morrison et al.
9,609,581 B2    3/2017   Baghel et al.
(Continued)

FOREIGN PATENT DOCUMENTS

JP           6016986 B1   10/2016
KR   10-2015-0135394 A   12/2015
(Continued)

OTHER PUBLICATIONS

International Search Report dated Dec. 22, 2017 in connection with International Patent Application No. PCT/KR2017/012399, 2 pages.
(Continued)

*Primary Examiner* — Sulaiman Nooristany

(57) ABSTRACT

According to various embodiments of the present invention, an electronic device may comprise a communication circuit configured to perform proximity-based service direct discovery; and a processor configured to broadcast a safety message related to the electronic device via the communication circuit in a first safe operation mode, and receive a safety message broadcast from at least one external electronic device in a second safe operation mode different from the first safe operation mode, and various embodiments are possible.

16 Claims, 14 Drawing Sheets

(51) Int. Cl.
| | |
|---|---|
| *H04M 1/725* | (2021.01) |
| *H04W 4/02* | (2018.01) |
| *H04W 4/06* | (2009.01) |
| *H04W 8/00* | (2009.01) |
| *H04W 72/00* | (2009.01) |
| *H04W 88/02* | (2009.01) |
| *H04W 92/18* | (2009.01) |

(52) U.S. Cl.
CPC ............ *H04W 4/06* (2013.01); *H04W 4/50* (2018.02); *H04W 8/005* (2013.01); *H04W 72/005* (2013.01); *H04W 88/02* (2013.01); *H04W 92/18* (2013.01)

(56) References Cited

U.S. PATENT DOCUMENTS

2014/0213250 A1* 7/2014 Baek ................. H04W 8/005
455/434
2015/0035685 A1* 2/2015 Strickland ............. B60Q 1/525
340/901
2018/0122240 A1 5/2018 Shirosaki et al.
2018/0295671 A1* 10/2018 Kim ..................... H04W 76/00

FOREIGN PATENT DOCUMENTS

| KR | 10-2016-0110965 A | 9/2016 |
|---|---|---|
| WO | 2014/208033 A2 | 12/2014 |

OTHER PUBLICATIONS

Written Opinion of the International Searching Authority dated Dec. 22, 2017 in connection with International Patent Application No. PCT/KR2017/012399, 7 pages.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 v12.0. (Dec. 2013), 349 pages.

* cited by examiner

DEVICE AND METHOD FOR PROVIDING V2P SERVICE ON BASIS OF PROXIMITY-BASED SERVICE DIRECT COMMUNICATION

CROSS-REFERENCE TO RELATED APPLICATIONS

This application is a 371 of International Application No. PCT/KR2017/012399 filed on Nov. 3, 2017, which claims priority to Korean Patent Application No. 10-2016-0145954 filed on Nov. 3, 2016, the disclosures of which are herein incorporated by reference in their entirety.

BACKGROUND

1. Field

Various embodiments of the present invention relate to electronic devices with communication functionality, e.g., electronic devices and methods of providing vehicle-to-pedestrian (V2P) services based on proximity-based service direct discovery.

2. Description of Related Art

In order to meet the demand for wireless data traffic soaring since the 4th generation (4G) communication system came to the market, there are ongoing efforts to develop enhanced 5th generation (5G) communication systems or pre-5G communication systems. For these reasons, the 5G communication system or pre-5G communication system is called the beyond 4G network communication system or post long-term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the big data processing technology and the IoT technology through, e.g., a connection with a cloud server.

To implement the IoT, technology elements, such as a sensing technology, wired/wireless communication and network infrastructure, service interface technology, and security technology, are required. There is ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create new value for human life. The IoT may have various applications, such as the smart home, smart building, smart city, smart car or connected car, smart grid, health-care, smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network as a big data processing technique may be said to be an example of the convergence of the 5G and IoT technologies.

As another example, vehicle-to-everything (V2X) means a specific communication technology to implement a 'connected vehicle' or 'network vehicle' which is a normal term to denote all kinds of communication schemes available for transportation means on roads, e.g., vehicles. V2X networking comes largely in three communication types: vehicle-to-infrastructure (V2I); vehicle-to-vehicle (V2V); and vehicle-to-pedestrian (V2P).

The V2I and V2V technologies have been developed primarily to enhance road safety and, along with the development of wireless communication technology within last few years, is under consideration for other various additional IT services than its initial safety-related use cases. Major developed countries, such as those in the European Union and North America as well as Japan and South Korea of have been verifying the utility and applicability of the Telematics/ITS technology with large-scale projects over the past few years.

In response to such a trend, the 3rd Generation Partnership Project (3GPP) is proceeding with standardization for providing LTE advanced-based V2X communication. The service aspects (SA) group has defined requirements to be met by V2X communication and agreed with use of device-to-device (D2D) discovery and communication functionality which have been applied to post-LTE Rel-12 systems for V2V and V2P purposes.

Also in consideration for V2I communication is taken communication with base stations (e.g., enhanced Node B or eNB) or road side units (RSUs) which are pieces of communication equipment installed on roads by the network provider. At this time, ambient vehicles may recognize an RSU as either an eNB or user equipment (UE). Thus, for ease of description in this disclosure, the type of an RSU when the RSU is recognized as an eNB is defined as 'eNB-type RSU,' and the type of the RSU when the RSU is recognized as a UE is defined as a 'UE-type RSU.' In V2I communication between a vehicle and a UE-type RSU, like in V2V and V2P communication, conventional D2D discovery and communication functionality may be used. In communication between an eNB or eNB-type RSU and a vehicle, conventional cellular uplink/downlink transmission/reception-based communication technology may be used.

Although conventional communication schemes may be used in LTE-based V2X communication as described above, it is predicted to partially modify the conventional communication schemes to meet the requirements for V2X communication. Thus, the 3GPP radio access network (RAN) group is considering modifications to the conventional communication schemes and various element techniques for supporting V2X communication by pre research in the LTE standardization procedure.

In particular, as a V2P communication service based on the 3GPP LTE-based D2D communication (e.g., proximity-based service direct discovery (ProSe Direct Discovery)), modifications to the safety message communication scheme are required.

Thus, there may be provided an electronic device and method of providing a V2P communication service capable of periodically or aperiodically transmitting and receiving safety messages (SM) (e.g., basic safety message for pedestrian (BSMP)) between UEs using 3GPP LTE-based D2D communication through the safety message protocol (SMP) which has been defined in addition to the conventional 3GPP LTE-based D2D communication channel structure.

There may also be provided an electronic device and method of providing a V2P service capable of broadcasting safety messages (e.g., BSMP) or receiving safety messages broadcast from at least one external electronic device according to the safety operation mode of the electronic device when providing a V2P service using 3GPP LTE-based D2D communication.

SUMMARY

According to various embodiments, an electronic device may comprise a communication circuit configured to perform proximity-based service direct discovery and a processor configured to broadcast a safety message related to the electronic device via the communication circuit in a first safety operation mode, and receive a safety message broadcast from at least one external electronic device in a second safety operation mode different from the first safety operation mode.

According to various embodiments, a method of providing a safety message communication service by an electronic device configured to provide a vehicle-to-pedestrian (V2P) service based on proximity-based service direct discovery may comprise broadcasting a safety message related to the electronic device via a communication circuit of the electronic device in a first safety operation mode, and receiving a safety message broadcast from at least one external electronic device via the communication circuit of the electronic device in a second safety operation mode different from the first safety operation mode.

According to various embodiments, there is provided a storage medium storing commands configured to, when executed by at least one processor, enable the at least one processor to perform at least one operation that may comprise, by an electronic device configured to provide a V2X service based on proximity-based service direct communication, broadcasting a safety message related to the electronic device via a communication circuit of the electronic device in a first safety operation mode, and receiving a safety message broadcast from at least one external electronic device via the communication circuit of the electronic device in a second safety operation mode different from the first safety operation mode.

According to various embodiments, there may be provided a V2P service capable of periodically or aperiodically providing safety messages (SMs) between UEs using 3GPP LTE-based D2D communication.

There may also be provided a V2P service capable of broadcasting safety messages (SMs) or receiving safety messages broadcast from at least one external electronic device according to the safety operation mode of the electronic device when providing a V2P service using 3GPP LTE-based D2D communication.

DETAILED DESCRIPTION

Figure 1:
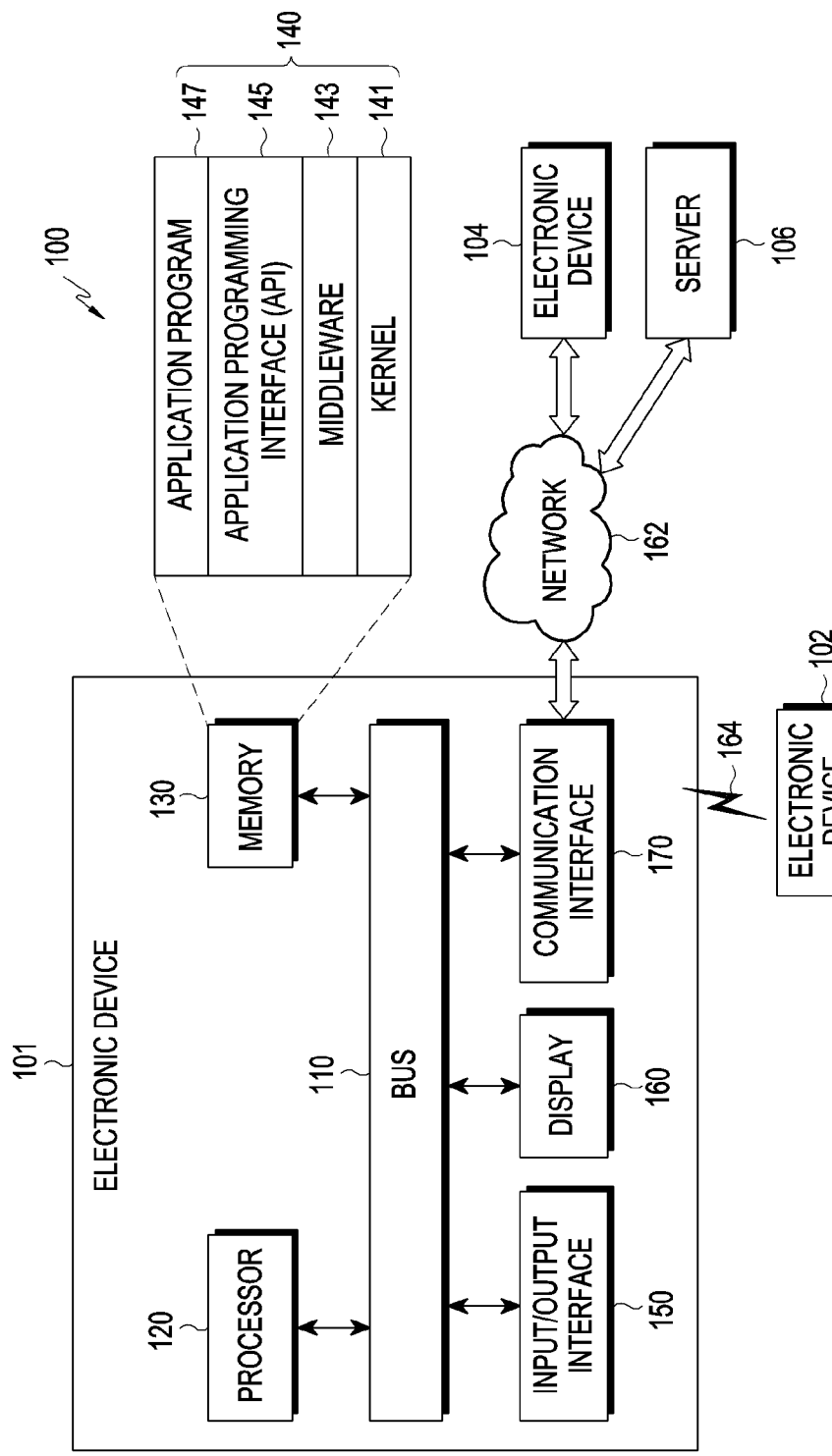
FIG. 1 illustrates a network environment including an electronic device according to according to various embodiments.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, a desktop PC, a laptop computer, a netbook computer, a workstation, a personal digital assistant (PDA), a portable multimedia player (PMP), or a wearable device.

According to another embodiment, the electronic device may include at least one of a navigation device, a global navigation satellite system (GNSS) receiver, an event data recorder (EDR), a flight data recorder (FDR), an automotive infotainment device, an electronic device for a ship (e.g., a sailing navigation device or a gyro compass), avionics, vehicular head units, industrial or home robots, or drones.

According to some embodiments, the electronic device may be at least one of part of a piece of furniture, building/structure, vehicle, or electronic board. According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to an embodiment of the present disclosure, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147.

At least a portion of the kernel 141, middleware 143, or API 145 may be denoted as an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority.

The API 145 is an interface allowing the application 147 to control functions provided from the kernel 141 or the middleware 143. For example, the API 133 may include at least one interface or function (e.g., a command) for filing control, window control, image processing, or text control.

For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106).

Figure 2:
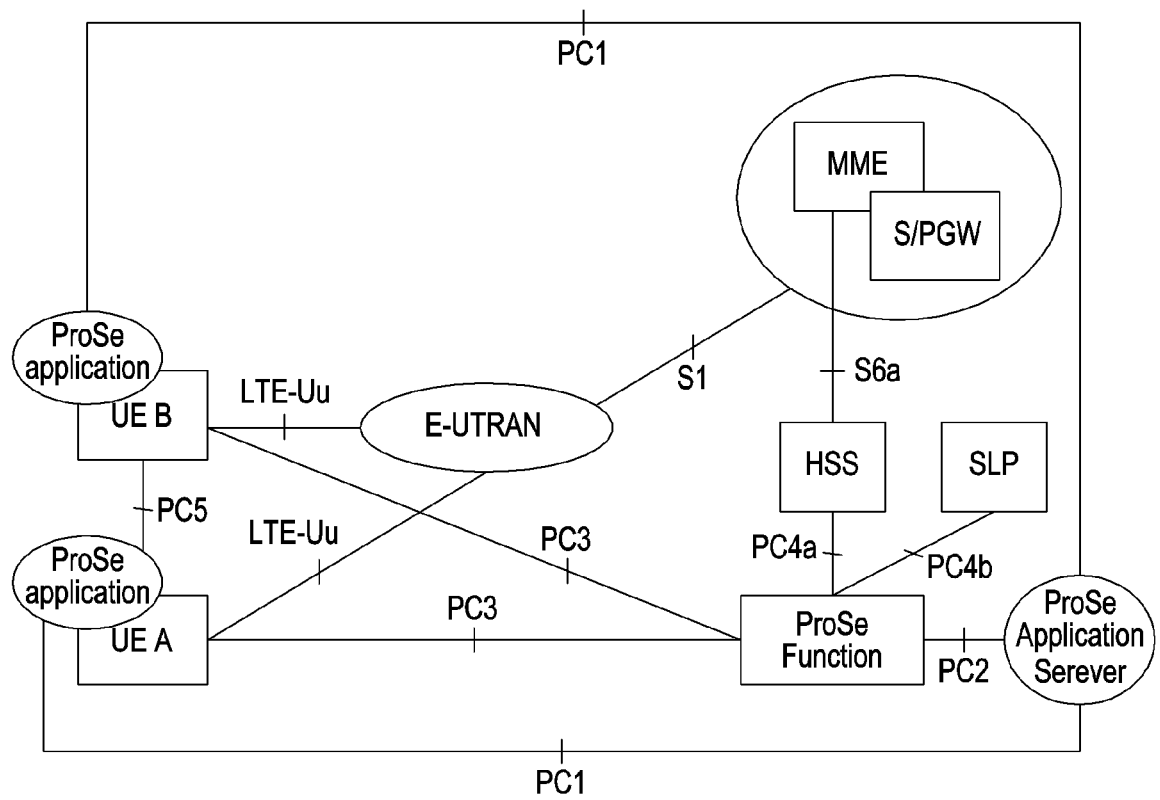
FIG. 2 is a view illustrating a system architecture to provide a V2P service based on proximity-based service direct discovery according to various embodiments.

FIG. 2 is a view illustrating a system architecture to provide a V2P service based on proximity-based service direct discovery according to various embodiments.

Referring to FIG. 2, a system for providing a proximity-based service direct discovery-based V2P service may include at least one of a plurality of UEs (e.g., UE A and UE B) with ProSe applications, a ProSe function, or a ProSe application server. The system may further include an evolved universal terrestrial radio access (E-UTRAN), or a core network entity (e.g., MME, S/PGW, HSS, or SLP).

The UE A and the UE B are user equipment (UE) capable of supporting direct communication service (e.g., V2X service) based on proximity-based service direct discovery when a proximity-based service direct discovery (e.g., ProSe direct discovery)-based application (e.g., a ProSe application) is executed, such as smartphones or other mobile phones, smart watches or other wearable devices, tablets or laptop PCs supporting communication service, or automobiles, motorcycles, or other vehicles with an embedded communication chip or capable of communicating the UEs. ProSe direct discovery-based inter-UE direct discovery services may include V2P services. The V2P services may include, e.g., a safety message communication service capable of transmitting and receiving safety messages (e.g., basic safety message for pedestrians (BSMP) related to the safety of each UE between the UEs. Each UE, i.e., the UE A and the UE B, may be in communication connection to perform service authentication for the V2P service with the ProSe function, which provides the V2P service, so as to receive the V2P service.

The ProSe function is a proximity-based service network entity (ProSe network entity) capable of proximity-based service direct discovery-based inter-UE direct discovery service.

Each UE and the ProSe function may perform service authentication on the service that the UE supports. For example, the UE A may send a request for subscribing to/registering in a service (e.g., a safety message communication service as the V2P service), which the UE A supports, to the ProSe function, and the ProSe function may send a response to accept or reject the request for subscription/registration to the UE A, thereby performing service authentication for the safety message communication service.

The UE B may, likewise, perform service authentication with the ProSe function. When the subscription/registration in the safety message communication service is completed by the service authentication, each UE may send a request for at least one key value for protecting the safety message to perform the safety message communication service for transmitting and receiving safety messages related to the safety of the UE between the UEs, to the ProSe function, and each UE may generate and transmit the at least one key value corresponding to the UE from the ProSe function.

The ProSe application server is a proximity-based service network entity (ProSe network entity) capable of proximity-based service direct discovery-based inter-UE direct communication service and may be controlled by a third party.

PC1 is a communication channel between the UE and the ProSe application server, PC2 is a communication channel between the ProSe application server and the ProSe function, PC3 is a communication channel between the UE and the ProSe function, PC4 (e.g., PC4a or PC4b) is a communication channel between the core network entity and the ProSe function, and PC5 is a direct communication channel between the UEs.

Figure 3:
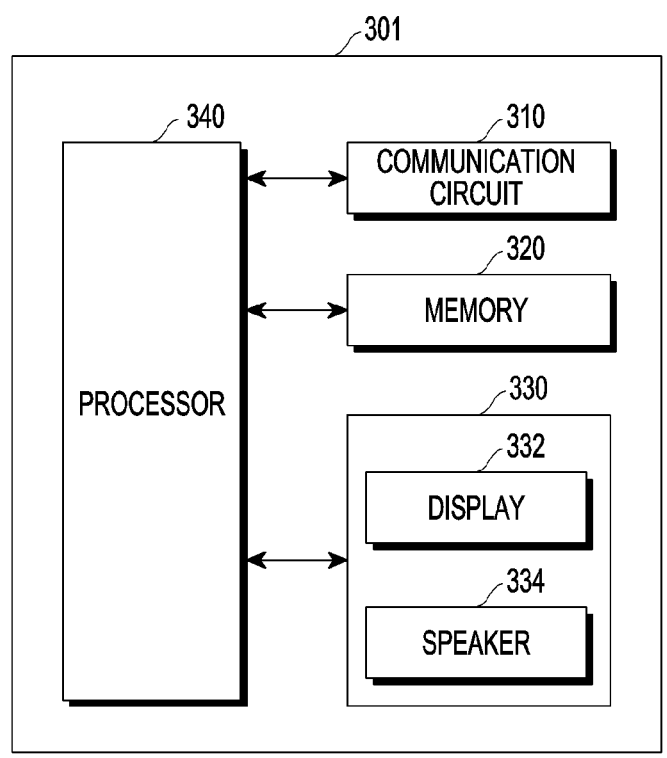
FIG. 3 is a block diagram illustrating an electronic device according to various embodiments.

FIG. 3 is a block diagram illustrating an electronic device according to various embodiments.

Referring to FIG. 3, according to various embodiments, an electronic device 301 is the user equipment (UE) shown in FIG. 2 and may include at least one of a communication circuit 310, a memory 320, an output device 330, or at least one processor 340. The electronic device 301 may include the whole or part of the electronic device 101 shown in FIG. 1 or the UEs (e.g., UE A or UE B) shown in FIG. 2.

The communication circuit 310 may perform communication connection with at least one external electronic device (e.g., the electronic device 104, or the user equipment (UE A or UE B), or a server (e.g., the ProSe function)) and may transmit or receive predetermined information to/from the at least one external electronic device. The communication circuit 310 may include the whole or part of the communication interference 170 shown in FIG. 1. The communication circuit 310 may include a plurality of communication circuits, e.g., a first communication circuit (not shown) and a second communication circuit (not shown). The communication circuit 310 may also be termed a communication unit or communication module which may include a communication unit or communication module as part thereof and may configure a communication unit or communication module.

According to an embodiment, the communication circuit 310 may provide data based on short-range communication. For example, the communication circuit 310 may perform communication connection with the at least one external electronic device connected to a first network via the communication circuit 310. For example, the communication circuit 310 may include cellular communication using at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the communication circuit 310 may include at least one of, e.g., a wireless fidelity (Wi-Fi), Bluetooth, near-field communication (NFC), Zigbee, z-wave, or GNSS.

According to an embodiment, the communication circuit 310 may provide packet data (or internet protocol)-based services. For example, the communication circuit 310 may perform communication connection with the at least one external electronic device connected to a second network via the communication circuit 310. For example, the communication circuit 310 may include at least one of, e.g., a computer network (e.g., local area network (LAN) or wide area network (WAN)), internet, or a telephony network.

The communication circuit 310 may receive information from the at least one external electronic device connected to at least one of the first network or the second network via, e.g., the communication circuit 310. For example, the information may include a safety message transmitted or received via vehicle-to-pedestrian (V2P) communication. The safety message may include at least one parameter related to the safety of the electronic device in a case where the user device type of the electronic device is a pedestrian type.

The memory 320 may store commands or data related to at least one other component of the electronic device 301. The memory 320 may include the whole or part of the memory 130 of FIG. 1. The memory 320 may store, e.g., at least one parameter related to the safety of the electronic device 301. Further, the memory 320 may store discovery messages transmitted and received between UEs. Further, the memory 320 may store discovery messages generated by including a safety message containing at least one parameter in the discovery message.

The memory 320 may store authentication information about a safety message communication service in a case where authentication for the service is performed in a server (e.g., the ProSe function) inside a home public land mobile network (HPLMN) supporting the inter-UE safety message communication service. The authentication information may be obtained from an authentication permission message responsive to an authentication request message for the safety message communication service. For example, the authentication information obtained from the authentication permission message may include at least one of PLMN information capable of performing proximity-based service direct discovery, communication coverage (e.g., long/medium/short) within which the electronic device 301 may announce or monitor, at least one key value to protect the safety message contained in the discovery message, or at least one algorithm related to the protection of safety message (e.g., integrity protection).

The memory 320 may store the safety message contained in the discovery message received from at least one external electronic device. The memory 320 may include at least one parameter related to the safety of the external electronic device contained in the received safety message. The memory 320 may store at least one of the location, speed, or moving direction of the external electronic device obtained based on the at least one parameter received. The memory 320 may store, e.g., a temporary computation value generated while obtaining at least one of the location, speed, or moving direction of the external electronic device.

The memory 320 may store a UE safety profile and UE safety message capability of the electronic device 301. For example, the UE safety profile denotes set values related to the safety message communication service of the electronic device for the UE, i.e., the electronic device 301, to perform the safety message communication service and may include a plurality of parameters. For example, when a safety application for performing the safety message communication service is executed, the electronic device 401 may load the set values for the plurality of parameters of the UE safety profile from the memory 320 and set the electronic device 301 with the set values, thereby supporting the safety message communication service.

According to an embodiment, the UE safety profile may include at least one parameter of safety operation mode, supportable frequency band, user device type, supportable service type, supportable message type, message transmission mode, message transmission mode determination method, message transmission mode determination priority, message transmission period, message transmission period change or not, data congestion determination method, data congestion determination priority, UE data reception error rate measurement window size, UE data reception error rate threshold, UE speed measurement window size or UE speed threshold. The UE safety profile is not limited thereto and may add later. The user may set a value for each parameter of the UE safety profile.

The safety operation mode denotes the operation mode of the electronic device 301 when the safety message communication service is run as a V2P service on the electronic device 301 and is actually operated and, as an example, may be set to either a pedestrian mode or vehicle mode. The processor 340 may enable the safety operation mode to be set automatically or manually. For example, the safety operation mode may be set manually by the user. As the user runs the safety application related to the safety message communication service on the electronic device 301 and selects a first safety mode or a second safety mode as the safety operation mode, the safety operation mode may manually be set. The processor 340 may load, from the memory 320, set values for the plurality of parameters of the UE profile corresponding to the safety operation mode selected by the user and set the electronic device 301.

The safety operation mode may be automatically recognized and set as well. For example, although the safety operation mode is not set by the user, the processor 340 may automatically recognize the user device type of the electronic device 301 and automatically set the safety operation mode. For example, when the user device type of the electronic device 301 is a pedestrian type, the processor 340 may automatically recognize the same and set the safety operation mode to the first safety operation mode (e.g., a pedestrian mode) and, when the user device type of the electronic device 301 is a vehicle type, the processor 340 may automatically recognize the same and set the safety operation mode to the safety operation mode (e.g., a vehicle mode).

For example, when the safety application is executed, the electronic device 301 may support a V2P service using proximity-based service direct discovery (e.g., ProSe direct discovery) supporting basic safety messages for pedestrians (BSMP). At this time, in a case where the safety operation mode of the electronic device 301 is the first safety operation mode (e.g., pedestrian mode), the electronic device 301 may operate as an announcing UE. That is, the processor 340 in the first safety operation mode may generate a discovery message by including a safety message (e.g., BSMP) related to the electronic device 301 in the discovery message, as a V2P service, and periodically or aperiodically broadcast the generated discovery message.

Further, in a case where the safety operation mode of the electronic device 301 is the second safety operation mode (e.g., vehicle mode), the electronic device 301 may operate as a monitoring UE. That is, the processor 340 in the second safety operation mode may periodically or aperiodically receive discovery messages broadcast from at least one external electronic device, as the V2P service. The received discovery message may include a safety message (e.g., BSMP) containing at least one parameter related to the safety of the external electronic device.

The supportable frequency band is a frequency band used when the electronic device 301 performs safety message communication and, as an example, may be set to either a licensed band, which the communication provider has been allowed to use by the government or an industrial scientific medical band (ISM) band (which is also referred to as an unlicensed band), which may be used for industrial, scientific, and medical devices without the government permission.

The user device type denotes the physical device type of the electronic device 301 and may be set to any one of, e.g., pedestrian type, vehicle type, or pedestrian-vehicle mutable type. For example, in a case where the electronic device 301 is a handset terminal, such as a smartphone or other mobile phone or tablet, the user device type may be set to the pedestrian type. In a case where the electronic device 301 is an automobile, motorcycle, or a vehicle itself or a terminal embedded in or in connection (e.g., including all connections via a hardware/software interface) with the vehicle, the user device type may be set to the vehicle type. In a case where the electronic device 301 is a terminal capable of supporting both the pedestrian type and the vehicle type, the user device type may be set to the pedestrian-vehicle mutable type.

The supportable service type denotes the type of V2X services that may be supported upon safety message communication, as set forth above, and may include, e.g., V2P.

The supportable message type denotes the type of safety messages transmitted and received between UEs upon safety message communication and may include, e.g., basic safety messages for pedestrians (BSMP). The safety message type is not limited thereto and may include other types of safety messages.

The message transmission mode denotes the transmission mode of safety messages transmitted and received between UEs upon safety message communication and may include, e.g., a first transmission mode (e.g., an Always on mode) in which safety messages are always transmitted, a second transmission mode (e.g., an off mode) in which safety message transmission is not performed or stopped, and a third transmission mode (e.g., a conditional on mode) in which safety messages are transmitted depending on contexts.

The message transmission mode determination method denotes a method for determining the transmission mode in a case where the transmission mode of the electronic device 301 is set to the third transmission mode (e.g., conditional on mode) and may include a plurality of determination methods. For example, the message transmission mode determination method may include at least one of a first transmission mode determination method (e.g., a geo-fence-based determination method) that determines the transmission mode depending on whether the electronic device 301 enters a designated area or a second transmission mode determination method (e.g., a ProSe direct discovery request-based determination method) that determines the transmission mode depending on whether the electronic device 301 receives a proximity-based service direct discovery request signal within a designated range.

The message transmission mode determination priority denotes the priority of transmission mode determination methods. Priorities for a plurality of transmission mode determination methods may be set in the electronic device 301. For example, the electronic device 301 may receive priorities for a plurality of transmission mode determination methods from the user, and the plurality of transmission mode determination methods may be signified in order depending on the priorities received.

The message transmission period denotes the period of broadcasting a safety message transmitted or received upon safety message communication and may be set in a time unit (e.g., ms). For example, the transmission period may be set to 320 ms as default, and the processor 401 may vary the transmission period depending on whether the message transmission period needs to be changed and/or the state of data congestion.

The message transmission period change or not denotes whether to change the transmission period of safety message transmitted or received upon safety message communication and may be set to either 'on' where the safety message transmission period may be varied depending on, e.g., the state of data congestion or 'off' where the safety message transmission period remains unchanged.

The data congestion determination method denotes a method for determining the state of communication of the safety message, i.e., congestion for transmission/reception of the safety message in a case where the message transmission period change or not is set to on and may include a plurality of determination methods. For example, the data congestion determination method may include at least one of a method in which the base station determines data congestion, a method in which the UE determines data congestion according to the data reception error rate, or a method in which the UE determines data congestion according to its moving speed.

The data congestion determination priority denotes the priority of data congestion determination methods. Priorities for a plurality of data congestion determination methods may be set in the electronic device 301. For example, the processor 340 may receive priorities for a plurality of data congestion determination methods from the user, and the plurality of data congestion determination methods may be signified in order depending on the priorities received.

The UE data reception error rate measurement window size denotes a predetermined time size determined to measure the data reception error rate of the UE in a case where the data congestion determination method is set to the method in which the UE determines data congestion according to the UE's data reception error rate. Because the UE's data reception error rate may vary at each measurement time, the processor 340 may define the predetermined time size, i.e., window size, and produce the average of data reception error rates of the electronic device 301 measured within the window size of time as the UE data reception error rate. For example, the UE data reception error rate measurement window size may be set to 1000 ms as default.

The UE data reception error rate threshold denotes a threshold set for the UE data reception error rate to determine data congestion in a case where the data congestion determination method is set to the method in which the UE determines data congestion depending on the UE's data reception error rate. The processor 340 may determine data congestion based on the threshold and the UE data reception error rate. For example, the UE data reception error rate threshold may be set to 30% as default.

The UE speed measurement window size denotes a predetermined time size determined to measure the moving speed of the UE in a case where the data congestion determination method is set to the method in which the UE determines data congestion according to the UE's moving speed. Because the UE's speed may vary at each measurement time, the processor 340 may define the predetermined time size, i.e., window size, and produce the average of moving speeds of the electronic device 301 measured within the window size of time as the UE's speed. For example, the UE speed measurement window size may be set to 1000 ms as default.

The UE speed threshold denotes a threshold set for the UE speed to determine data congestion in a case where the data congestion determination method is set to the method in which the UE determines data congestion depending on the UE's moving speed. The processor 340 may determine data congestion based on the threshold and the UE speed. For example, the UE speed threshold may be set to 30 km/h as default.

According to an embodiment, the UE safety message capability denotes what the electronic device 301 supports in connection with safety messages. The UE (i.e., the electronic device 301) may send the UE safety message capability along to the server upon performing service authentication with the server (e.g., the ProSe application) of the base station (e.g., eNB) for the safety message communication service as the V2P service, thereby notifying that the UE may support the V2P service. The UE safety message capability may contain at least some of the UE safety profiles. For example, the UE safety message capability may include at least one of the supported frequency band which denotes the frequency band supported by the UE, user device type which denotes the physical type of the current UE, service type which denotes the type of service supported by the UE, or message type which denotes the type of message supported by the UE. In this disclosure, the message type may be BSMP. Further, the UE safety message capability may include an encryption algorithm type which denotes the type of an encryption algorithm supported by the UE to protect safety messages transmitted and received between the UEs. For example, the encryption algorithm type may include an integrity guarantee-related encryption algorithm to guarantee the integrity of safety messages.

The output device 330 may include at least one of a display 332 or a speaker 334. The display 332 may include the whole or part of the display 160 shown in FIG. 1.

In a case where the electronic device 301 is in the second safety operation mode (e.g., vehicle mode), the display 332 may display at least one of the location, speed, or moving speed of the electronic device 301 and the external electronic device based on at least one parameter of the safety message contained in the discovery message received from the at least one external electronic device. Further, in a case where the electronic device 301 is in the second safety operation mode (e.g., vehicle mode), the display 332 may display a notification message to indicate entry of the at least one external electronic device, within a safety distance range (TH) set for the electronic device 301, based on at least one parameter of the safety message contained in the discovery message received from the at least one external electronic device. For example, the notification message may be displayed on the display 332 in the form of a popup window.

The speaker 334 may include the whole or part of the input/output interface 150 shown in FIG. 1. In a case where the electronic device 301 is in the second safety operation mode (e.g., vehicle mode), the speaker 334 may output an alarm sound or voice message (e.g., a warning comment) to indicate entry of the at least one external electronic device, within a safety distance range (TH) set for the electronic device 301, based on at least one parameter of the safety message contained in the discovery message received from the at least one external electronic device.

According to an embodiment of the present invention, the processor 340 may overall control the electronic device 301. The processor 340 may include the whole or part of the processor 120 shown in FIG. 1. The processor 340 may control multiple hardware and software components connected to the processor 340 by running, e.g., an operating system or application programs, and the processor 210 may process and compute various data. The processor 340 may be implemented in, e.g., a system on chip (SoC). According to an embodiment of the present disclosure, the processor 340 may further include a graphic processing unit (GPU) and/or an image signal processor. The processor 340 may include at least some (e.g., the communication circuit 310) of the components shown in FIG. 3. The processor 340 may load a command or data received from at least one of other components (e.g., the communication circuit 310, the memory 320, or the output device 330) on a volatile memory, process the command or data, and store various data in the non-volatile memory.

In particular, the processor 340 may overall control the electronic device 301 to provide a safety message communication service capable of transmitting and receiving inter-UE integrity-guaranteed safety messages as a V2P communication service based on 3GPP LTE-based D2D communication (e.g., ProSe direct discovery). According to an embodiment, the safety message may include a BSMP.

The processor 340 may perform the safety message communication service using a safety message protocol (SMP) defined in addition to the communication channel architecture of the communication circuit 310 to transmit and receive safety messages related to the safety of a corresponding UE between UEs.

The processor 340 may set the electronic device 301 based on the UE safety profile of the electronic device 301 to perform the safety message communication service when a designated condition is met. For example, the processor 340 may run a safety application to perform the safety message communication service when the designated condition is met. When the safety application runs, the processor 340 may load the UE safety profile of the electronic device 301 from the memory 320 to set the electronic device 301 with set values for at least one parameter of the UE safety profile stored in the memory 320.

According to an embodiment, the designated condition may include at least one of a turn-on of the electronic device, reception of a discovery message from a road side unit (RSU), communication connection with a designated cell area, a change in the cell area where the electronic device is in communication connection, entry to a designated area, or exit from the designated area.

For example, in a case where the electronic device 301 is turned on, the processor 340 may be configured to run the safety application for performing the safety message communication service to enable the electronic device 301 to perform the safety message communication service.

Further, upon communication connection with a designated cell area, the processor 340 may be configured to run the safety application for performing the safety message communication service to enable the electronic device 301 to perform the safety message communication service. For example, in a case where the cell identification (ID) of the cell area where the electronic device 301 is in communication connection is a designated business network, the processor 340 may be configured to recognize that the electronic device 301 is located indoors and refrain from running the safety application or stop the safety application which is in execution. In contrast, in a case where the cell ID of the cell area where the electronic device 301 is in communication connection is a designated particular cell area indicating 'outdoors,' the processor 340 may be configured to recognize that the electronic device 301 is located outdoors and run the safety application to enable the electronic device 301 to perform the safety message communication service. Further, in a case where the cell area where the electronic device 301 is in communication connection switches from a pico cell to a micro cell (e.g., handover), the processor 304 may be configured to run the safety application to enable the electronic device 301 to perform the safety message communication service.

Further, upon receiving a discovery message from, e.g., at least one RSU, the processor 340 may be configured to recognize that the current location of the electronic device 301 is a road and run the safety application to enable the electronic device 301 to perform the safety message communication service.

Further, upon entering, e.g., a designated particular area or location (e.g., the entrance to a Samsung Electronics building), the processor 340 may be configured to run the safety application to enable the electronic device 301 to perform the safety message communication service. In contrast, upon departing off the designated particular area or location, the processor 340 may stop the safety application which is in execution to thereby enable the electronic device 301 to stop the safety message communication service.

The processor 340 may identify the set safety operation mode of the electronic device 301 based on the UE safety profile. For example, the safety operation mode may include a first safety operation mode (e.g., pedestrian mode) and a second safety operation mode (e.g., a vehicle mode).

According to an embodiment, when the identified safety operation mode of the electronic device 301 is the first safety operation mode (e.g., pedestrian mode), the processor 340 may enable the electronic device 301 to operate as an announcing UE. In other words, the processor 340 may broadcast safety messages related to the electronic device 301 in the first safety operation mode. For example, the processor 340 may generate a discovery message containing a safety message in the first safety operation mode. For example, an existing discovery message format based on proximity-based service direct discovery may include a message type field (8 bits), a ProSe application code field (184 bits), a message integrity check (MIC) field (32 bits), and a coordinated universal time-based counter least significant bit (UTC-based counter LSB) field (8 bits) as set forth below in Table 1.

TABLE 1

| Information Element | Type/Reference | Length (bits) |
|---|---|---|
| Message Type | Discovery type value (2 bits) 01 Open discovery Discovery type model value (2 bits) 01 Model A The rests: reserved | 8 |
| ProSe Application Code | a bit string coded as specified in 3GPP TS 23.003 | 184 |
| MIC | Message Integrity Check | 32 |
| UTC-based Counter LSB | The four least significant bits of the UTC-based counter | 8 |

Referring to Table 1 above, a total of eight bits may be allocated to the message type field that may include, e.g., a field (2 bits) to indicate the discovery type value, a field (2 bits) to indicate the discovery model value, and a reserved field (4 bits) to indicate a reserved space for additionally defining a predetermined value.

The processor 340 may additionally define a value for indicating the safety message (e.g., BSMP) in the reserved field (4 bits) to add the safety message to the existing discovery message. For example, the processor 340 may add, e.g., "0001" which is 4-bit long, to the reserved field, as the value to indicate the safety message. That is, when the reserved field contains "0001," the discovery message may be interpreted as containing the safety message. It will be appreciated by one of ordinary skilled in the art that the value to indicate the safety message as defined in the reserved field is not limited to "0001" and may be any value that does not overlap the values used in the other fields.

Further, a code to indicate the type of the existing discovery message (e.g., advertisement, coupon, or community information) other than the safety message may be stored in the application code (e.g., ProSe application code) field. For example, a total of 184 bits may be allocated to the application code field and, among them, the 160-bit resource in total, except for 24 bits related to identification information (ID) (e.g., mobile country code (MCC) or mobile network code (MNC), may be provided. A code to indicate the type of the discovery message (e.g., advertisement, coupon, or community information) may be stored in part of the resource of 160 bits in total. Further, the processor 340 may generate the discovery message by including at least one parameter related to the safety message in at least part of the resource of 160 bits in total of the application code field.

According to an embodiment, the at least one parameter related to the safety message is set forth below in Table 2.

TABLE 2

| Contents | Size (bytes) |
|---|---|
| DSRCmsgID | 1 |
| MsgCount | 1 |

TABLE 2-continued

| Contents | Size (bytes) |
|---|---|
| TemporaryID | 4 |
| DSecond | 2 |
| Latitude | 4 |
| Longitude | 4 |
| Elevation | 2 |
| PositionAccuracy | 4 |

Referring to Table 2 above, the at least one parameter related to the safety message may include at least one of identification information (ID) (e.g., DSRCmsgID) to indicate what safety message set the safety message is included, a number (e.g., MsgCount) assigned to data streams with the same identification information (e.g., DSRCmsgID) from the same sender, a random ID (e.g., TemporaryID) of device which is periodically varied, time (e.g., 1 minute is represented in milliseconds) (e.g., DSecond), latitude (e.g., Latitude), longitude (e.g., Longitude), terrestrial height (e.g., Elevation), position accuracy (e.g., PositionAccuracy), or speed (e.g., Speed). The at least one parameter is not limited thereto and may rather include various types of parameters related to the external electronic device (e.g., pedestrian type external electronic device).

The MIC field may include at least one key value for identifying the integrity of the safety message in a case where the discovery message contains the safety message and a total of 32 bits may be allocated to the MIC field.

The processor 340 may further perform service authentication with the server (e.g., ProSe function) to perform the safety message communication service. The service authentication may be performed, e.g., in a case where the electronic device 301 lacks authentication information about the safety message communication service before proximity-based service direct discovery is set, or the service authentication is expired.

For the service authentication, e.g., the processor 340 may transmit, to the server (e.g., ProSe function) in the HPLMN, an authentication request message for authentication on the safety message communication service based on the UE safety message capability of the electronic device 301. The server is a communication provider or proximity-based service network entity supporting the inter-terminal safety message communication service.

The authentication request message may include, e.g., the ID (e.g., UE identity) (and/or group ID) of the electronic device 301, application ID (e.g., ProSe application ID), command (e.g., announce or monitor), and the UE safety message capability.

The ID of the electronic device is identification information to identify the electronic device, and the authentication request message may include the ID of the group where the electronic device belongs, as well as the ID of the electronic device.

The application ID is identification information to identify a particular application and may be a globally unique ID. For example, the ProSe application ID is identification information used for open ProSe direct discovery and may play a role to specify the application. The ProSe application ID may contain a ProSe application Name that may have layers. For example, the ProSe application Name may have such layers as business category (Level 0), business sub-category (Level 1), business name (Level 2), and shop name (Level 3).

The command is information about the safety operation mode set in the electronic device when the safety message communication service is performed. The command may indicate that the electronic device may be operated as an announcing UE (e.g., command=announce) in a case where the electronic device is set to the first safety operation mode (e.g., pedestrian mode) and that the electronic device may be operated as a monitoring UE (e.g., command=monitor) in a case where the electronic device is set to the second safety operation mode (e.g., vehicle mode).

The UE safety message capability denotes what the electronic device 301 supports in connection with a safety message communication service, and the UE safety message capability may include at least part of the UE safety profile.

According to an embodiment, the UE safety message capability may include at least one of the supported frequency band which denotes the frequency band supported by the UE, user device type which denotes the physical type of the current UE, service type which denotes the type of service supported by the UE, or message type which denotes the type of message supported by the UE. Further, the UE safety message capability may include an encryption algorithm type which denotes the type of an encryption algorithm supported by the UE to protect safety messages transmitted and received between the UEs. For example, the encryption algorithm type may include an integrity guarantee-related encryption algorithm to guarantee the integrity of safety messages.

The UE (i.e., the electronic device 301) may notify the server that the UE, i.e., the electronic device 301, supports the safety message communication service as the V2P service by sending the authentication request message containing the ID and/or group ID of the electronic device 301, application ID, command, and the UE safety message capability at the service authentication request for the safety message communication service to the server for the safety message communication service as the V2P service.

The processor 340 may receive an authentication permission message for the safety message communication service in response to the request message from the server (e.g., ProSe function). For example, upon receiving the authentication request message from the electronic device 301, the server may identify whether the electronic device 301 is a device subscribing to/registered in the safety message communication service based on the ID (and/or group ID) of the electronic device 301, and/or application ID contained in the authentication request message. Upon identifying that the electronic device 301 is a device subscribing to/registered in the safety message communication service, the server may identify the communication coverage (e.g., long/medium/short) where the electronic device may announce or monitor and/or the PLMN where the electronic device may perform proximity-based service direct discovery based on the application ID contained in the authentication request message. Further, the server may identify at least one key value and/or encryption-related algorithm to guarantee the integrity of the safety message corresponding to the safety message type (e.g., BSMP) supported by the electronic device 301 based on the UE safety message capability contained in the authentication request message. Then, the server may transmit an authentication permission message containing the authentication information identified corresponding to the authentication request message to the electronic device 301. In other words, the processor 340 may receive the authentication permission message to permit authentication on the safety message communication service from the server. The authentication permission message may include, e.g., information about the PLMN where the electronic device 301 may perform proximity-based service direct discovery, the communication coverage (e.g., long/medium/short) where the electronic device may announce or monitor, and at least one key value and/or encryption-related algorithm to guarantee the integrity of the safety message (e.g., BSMP) corresponding to the safety message type supported by the electronic device 301.

Meanwhile, upon identifying that the electronic device is a device not subscribing to/registered in the safety message communication service, the server may transmit a service authentication failure message and/or service subscription/registration application message to the electronic device 301. In other words, the processor 340 may identify whether the electronic device 301 is authenticated for the safety message communication service by receiving the service authentication failure message and/or service subscription/registration application message via the communication circuit 310 from the server.

when the authentication on the safety message communication service is complete, the processor 340 may allocate a resource for the electronic device 301 to perform the inter-UE safety message communication service. For example, the processor 340 may send a request for using (or releasing) a resource pool for performing the safety message communication service to the base station (e.g., E-UTRAN) and receive a response to the request from the base station, and allocate the resource for performing the safety message communication service.

For example, the processor 340 may send a request for a permission to use the transmit resource pool for broadcasting the generated discovery message containing the safety message to the base station. For example, the processor 340 may transmit a request for a permission to use at least one resource pool for broadcasting the safety message-containing discovery message via the physical sidelink discovery channel (PSDCH) to the base station. For example, the electronic device may transfer a use request message for up to four resource pools to the LTE uplink resource, thereby transmitting it to the base station. The use request message may contain information for using the resource pool for performing the safety message communication service, and the information may be, e.g., sidelink UE information. The sidelink UE information may include, e.g., a field (e.g., discTxResourceReq) to indicate the request for using the resource pool.

The processor 340 may receive a permitted available transmit resource pool corresponding to the requested transmit resource pool, from the base station. For example, the processor 340 may receive a use permission message responsive to the use request message for the transmit resource pool from the base station. The electronic device 301 may allocate an available resource pool corresponding to the electronic device 301 based on the received use permission message.

For example, the use permission message received from the base station may be a system information block type (SIB) 19 message, and the use permission message may include the number of resources available, transmission period, available transmission frequency band and scheme of using available resources. For example, in response to the request to use the transmit resource pool, the number of available resource pools may be allocated in the electronic device. For example, the electronic device may receive an allocation of at least one available resource pool among up to four resource pools as requested, based on the communication state of the base station. The transmission period may be set depending on the number of resource pools available. For example, in a case where one of the four resource pools requested is allocated in the electronic device as the available resource pool permitted by the base station in the first safety operation mode, the broadcastable minimum period of the electronic device may be 320 ms which is the same as default. Further, in a case where all of the four resource pools requested are allocated in the electronic device as the available resource pools permitted to use by the base station in the first safety operation mode, the broadcastable minimum period of the electronic device may be reduced to 80 ms which results from dividing 320 ms, which is set as default, by 4. That is, when the electronic device uses the resource pools permitted to use to the maximum, i.e., all of the four resource pools requested, the broadcasting period of the electronic device may be 80 ms. The available transmission frequency band may be an LTE frequency band and may include a plurality of bands. The available resource pool may include any one of a first resource pool use scheme or a second resource pool use scheme. The first resource pool use scheme may be a type 1 scheme in which the electronic device may randomly select one from among at least one resource permitted to use. The second resource pool use scheme may be a type 2B scheme in which a resource to be used among at least one resource permitted to use is determined by the base station. Further, the use permission message may further include priority information about the available transmission frequency band. For example, in a case where there is a plurality of available frequency bands, the processor 340 may select the transmission frequency band depending on the priority information.

The processor 340 may broadcast the discovery message generated containing the safety message based on the permitted available transmit resource pool. For example, the processor 340 may broadcast the safety message-containing discovery message depending on the available resource pool count, transmission period, transmission frequency band, and use method contained in the use permission message received from the base station.

Meanwhile, according to an embodiment, when the identified safety operation mode of the electronic device 301 is the second safety operation mode (e.g., vehicle mode), the processor 340 may enable the electronic device 301 to operate as a monitoring UE. That is, the processor 340 in the second safety operation mode may periodically or aperiodically receive discovery messages containing a safety message related to the external electronic device from at least one external electronic device.

The processor 340 may identify whether the received discovery message contains the safety message related to the external electronic device. For example, the processor 340 may identify whether the message type field in the discovery message format received contains a field value indicating the safety message. For example, when the reserved field of the message type field in the received discovery message format contains a field value (e.g., "0001") indicating the safety message, the processor 340 may determine that the received discovery message contains the safety message and, unless the reserved field of the message type field in the received discovery message format contains a field value (e.g., "0001") indicating the safety message, the processor 340 may determine that the received discovery message lacks the safety message.

Upon identifying that the received discovery message contains the safety message, the processor 340 may output safety information related to the at least one external electronic device based on at least one parameter contained in the safety message. For example, upon identifying that the received discovery message contains the safety message, the processor 340 may examine all of the data fields allocated in the ProSe application code field in the received discovery message format and detect at least one parameter contained in the received safety message.

According to an embodiment, the at least one parameter detected from the safety message may include at least one of identification information (ID) (e.g., DSRCmsgID) to indicate what safety message set the safety message is included, a number (e.g., MsgCount) assigned to data streams with the same identification information (e.g., DSRCmsgID) from the same sender, a random ID (e.g., TemporaryID) of device which is periodically varied, time (e.g., 1 minute is represented in milliseconds) (e.g., DSecond), latitude (e.g., Latitude), longitude (e.g., Longitude), terrestrial height (e.g., Elevation), position accuracy (e.g., PositionAccuracy), or speed (e.g., Speed). The at least one parameter is not limited thereto and may rather include various types of parameters related to the external electronic device (e.g., pedestrian type external electronic device).

The processor 340 may output, via the output device (e.g., the display 332 and/or speaker 334) of the electronic device, safety information including at least one of the identification information (ID), location, speed, or moving direction of the external electronic device, obtained based on the at least one parameter detected. The operation of outputting the safety information on the electronic device is described in greater detail with reference to the interference screens shown in FIGS. 8*a* to 8*d*.

According to an embodiment, an electronic device 301 may comprise a communication circuit (e.g., the communication circuit 310) configured to perform proximity-based service direct discovery and a processor (e.g., the processor 340) configured to broadcast a safety message related to the electronic device 301 via the communication circuit 310 in a first safety operation mode, and receive a safety message broadcast from at least one external electronic device in a second safety operation mode different from the first safety operation mode.

According to an embodiment, the processor 340 may be further configured to, when a designated condition is met, configure the electronic device 301 based on a user equipment (UE) safety profile of the electronic device. The designated condition includes at least one of a turn-on of the electronic device 301, reception of a discovery message from an RSU, communication connection with a designated cell area, a change in a cell area where the electronic device 301 is in communication connection, entry to a designated area, or exit from the designated area.

According to an embodiment, a type of the safety message may be a BSMP.

According to an embodiment, the processor 340 may be configured to generate a discovery message containing the safety message related to the electronic device 301 in the first safety operation mode, transmit, to a base station, a request message containing information to request a permission to use at least one transmit resource pool to be used to broadcast the generated discovery message, and broadcast the generated discovery message based on a response message containing the permission to use the at least one transmit resource pool received from the base station in response to the request.

According to an embodiment, the information to request the permission to use the at least one transmit resource pool may be sidelink UE information.

According to an embodiment, the response message may include a period of broadcasting of the safety message contained in the generated discovery message.

According to an embodiment, the processor 340 may be configured to receive a discovery message broadcast from the at least one external electronic device in the second safety operation mode, identify whether the received discovery message contains a safety message related to a corresponding external electronic device, and when it is identified that the received discovery message contains the safety message, output safety information related to the at least one external electronic device based on at least one parameter contained in the identified safety message.

According to an embodiment, the safety information related to the at least one external electronic device obtained based on the at least one parameter may include at least one of identification information (ID), location, speed, or moving direction of the corresponding external electronic device.

According to an embodiment the processor 340 may be configured to display, on a display unit of the electronic device 301, locations of the electronic device 301 and the at least one external electronic device based on the at least one parameter contained in the identified safety message.

According to an embodiment, the processor 340 may be configured to calculate a distance between the at least one external electronic device and the electronic device 301 based on at least one parameter contained in the identified safety message and when the calculated distance is equal to or less than a threshold, transmit a notification to the electronic device 301.

According to an embodiment, the processor 340 may be configured to display the notification on a display (e.g., the display 332) of the electronic device 301 when the calculated distance is equal to or less than the threshold.

According to an embodiment, the processor 340 may be configured to output the notification, as an alert sound or a voice, via an output device (e.g., the speaker 334) when the calculated distance is equal to or less than the threshold.

Figure 4:
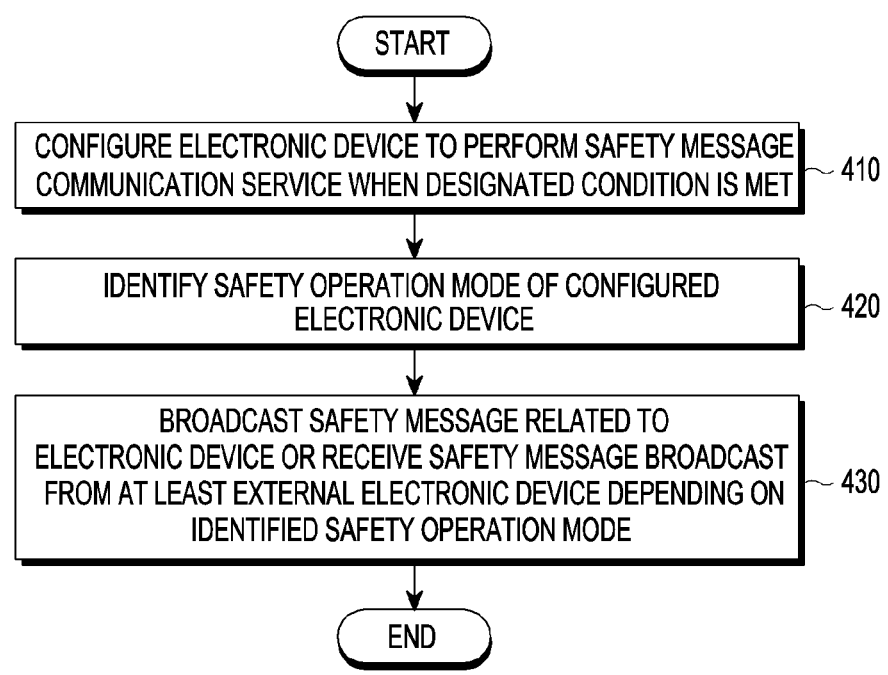
FIG. 4 is a flowchart illustrating a method of providing, by an electronic device, a V2P service based on proximity-based service direct discovery according to various embodiments.

FIG. 4 is a flowchart illustrating a method of providing, by an electronic device, a V2P service based on proximity-based service direct discovery according to various embodiments. The method may include operations 410 to 430. The method of providing the V2P service (e.g., safety message communication) by the electronic device may be performed by any one of an electronic device (e.g., the electronic device 301) or a processor (e.g., the processor 120 or the processor 340) of the electronic device.

In operation 410, e.g., when a designated condition is met, the electronic device may be configured to perform a safety message communication service.

For example, the electronic device may be set based on a UE safety profile of the electronic device when the designated condition is met. The UE safety profile denotes set values of the electronic device for the UE, i.e., the electronic device, to perform the safety message communication service and may include a plurality of parameters. For example, when a safety application for performing the safety message communication service is executed, the electronic device may load the set values for the plurality of parameters of the UE safety profile from a memory (e.g., the memory 320) and set the electronic device with the set values, thereby supporting the safety message communication service.

According to an embodiment, the UE safety profile may include at least one parameter of safety operation mode, supportable frequency band, user device type, supportable service type, supportable message type, message transmission mode, message transmission mode determination method, message transmission mode determination priority, message transmission cycle, message transmission cycle change or not, data congestion determination method, data congestion determination priority, UE data reception error rate measurement window size, UE data reception error rate threshold, UE speed measurement window size or UE speed threshold. The UE safety profile is not limited thereto and may add later.

According to an embodiment, the designated condition may include at least one of a turn-on of the electronic device, reception of a discovery message from a road side unit (RSU), communication connection with a designated cell area, a change in the cell area where the electronic device is in communication connection, entry to a designated area, or exit from the designated area.

For example, in a case where the electronic device is turned on, the electronic device may be configured to run the safety application for performing the safety message communication service to enable the electronic device to perform the safety message communication service.

Further, upon communication connection with a designated cell area, the electronic device may be configured to run the safety application for performing the safety message communication service to enable the electronic device to perform the safety message communication service. For example, in a case where the cell ID of the cell area where the electronic device 301 is in communication connection is a designated business network, the electronic device may be configured to recognize that the electronic device is located indoors and refrain from running the safety application or stop the safety application which is in execution. In contrast, in a case where the cell ID of the cell area where the electronic device is in communication connection is a designated particular cell area indicating 'outdoors,' the electronic device may be configured to recognize that the electronic device is located outdoors and run the safety application to enable the electronic device to perform the safety message communication service. Further, in a case where the cell area where the electronic device is in communication connection hands from a pico cell over to a micro cell, the electronic device may be configured to run the safety application to enable the electronic device to perform the safety message communication service.

Further, upon receiving a discovery message from, e.g., at least one RSU, the electronic device may be configured to recognize that the current location of the electronic device is a road and run the safety application to enable the electronic device to perform the safety message communication service.

Further, upon entering, e.g., a designated particular area or location (e.g., the entrance to a Samsung Electronics building), the electronic device may be configured to run the safety application to enable the electronic device to perform the safety message communication service. In contrast, upon departing off the designated particular area or location, the electronic device may stop the safety application which is in execution to thereby enable the electronic device to stop the safety message communication service.

In operation 420, e.g., the electronic device may identify the set safety operation mode of the electronic device based on the UE safety profile. For example, the safety operation mode may include a first safety operation mode and a second safety operation mode. The first safety operation mode denotes a case where the user device type of the electronic device is a pedestrian type in which case the electronic device may be operated as an announcing UE. The second safety operation mode denotes a case where the user device type of the electronic device is a vehicle type in which case the electronic device may be operated as a monitoring UE.

Meanwhile, the user device type denotes the physical device type of the electronic device and may be set to any one of, e.g., pedestrian type, vehicle type, or pedestrian-vehicle mutable type. For example, in a case where the electronic device is a handset terminal, such as a smartphone or other mobile phone or tablet, the user device type of the electronic device may be set to the pedestrian type. In a case where the electronic device is an automobile, motorcycle, or a vehicle itself or a terminal embedded in or in connection (e.g., including all connections via a hardware/software interface) with the vehicle, the user device type of the electronic device may be set to the vehicle type. In a case where the electronic device is a terminal capable of supporting both the pedestrian type and the vehicle type, the user device type of the electronic device may be set to the pedestrian-vehicle mutable type.

In operation 430, e.g., the electronic device may broadcast a safety message related to the electronic device or receive a safety message broadcast from at least one external electronic device, depending on the identified safety operation mode of the electronic device. For example, when the identified safety operation mode of the electronic device is the first safety operation mode, the electronic device may broadcast the safety message. In other words, the electronic device may be operated as an announcing UE. For example, when the identified safety operation mode of the electronic device is the second safety operation mode, the electronic device may receive the safety message broadcast from the at least one external electronic device. In other words, the electronic device may be operated as a monitoring UE.

Figure 5:
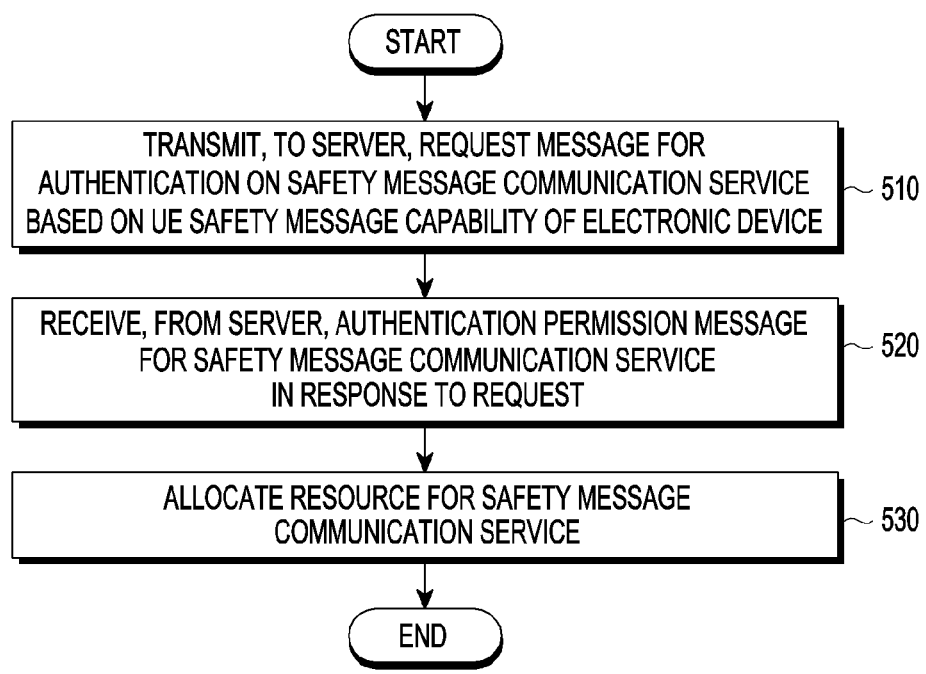
FIG. 5 is a flowchart illustrating a method of providing, by an electronic device, a V2P service based on proximity-based service direct discovery according to various embodiments.

FIG. 5 is a flowchart illustrating a method of providing, by an electronic device, a V2P service based on proximity-based service direct discovery according to various embodiments. The method may include operations 510 to 530. The method of providing the V2P service (e.g., safety message communication) by the electronic device may be performed by any one of an electronic device (e.g., the electronic device 301) or a processor (e.g., the processor 120 or the processor 340) of the electronic device.

In operation 510, e.g., the electronic device may transmit, to a server, an authentication request message for authentication on a safety message communication service based on UE safety message capability. For example, the electronic device may transmit the service authentication request message for authentication on the safety message communication service based on the UE safety message capability of the electronic device to the server (e.g., ProSe function) in the HPLMN supporting the inter-UE safety message communication service.

The authentication request message may include, e.g., the ID (e.g., UE identity) (and/or group ID) of the electronic device, application ID (e.g., ProSe application ID), command (e.g., announce or monitor), and the UE safety message capability.

The ID of the electronic device is identification information to identify the electronic device, and the authentication request message may include the ID of the group where the electronic device belongs, as well as the ID of the electronic device.

The application ID is identification information to identify a particular application and may be a globally unique ID. For example, the ProSe application ID is identification information used for open ProSe direct discovery and may play a role to specify the application. The ProSe application ID may contain a ProSe application Name that may have layers. For example, the ProSe application Name may have such layers as business category (Level 0), business sub-category (Level 1), business name (Level 2), and shop name (Level 3).

The command is information about the safety operation mode set in the electronic device when the safety message communication service is performed. The command may indicate that the electronic device may be operated as an announcing UE (e.g., command=announce) in a case where the electronic device is set to the first safety operation mode (e.g., pedestrian mode) and that the electronic device may be operated as a monitoring UE (e.g., command=monitor) in a case where the electronic device is set to the second safety operation mode (e.g., vehicle mode).

The UE safety message capability denotes what the electronic device supports in connection with a safety message communication service, and the UE safety message capability may include at least part of the UE safety profile.

According to an embodiment, the UE safety message capability may include at least one of the supported frequency band which denotes the frequency band supported by the UE, user device type which denotes the physical type of the current UE, service type which denotes the type of service supported by the UE, or message type which denotes the type of message supported by the UE. Further, the UE safety message capability may include an encryption algorithm type which denotes the type of an encryption algorithm supported by the UE to protect safety messages transmitted and received between the UEs. For example, the encryption algorithm type may include an integrity guarantee-related encryption algorithm to guarantee the integrity of safety messages. The electronic device may notify the server that the UE, i.e., the electronic device, supports the safety message communication service as the V2P service by sending the authentication request message containing the ID and/or group ID of the electronic device, application ID, command, and the UE safety message capability at the service authentication request for the safety message communication service to the server for the safety message communication service as the V2P service.

In operation 520, the electronic device may receive an authentication permission message for the safety message communication service from the server, in response to the authentication request message for the safety message communication service.

For example, upon receiving the authentication request message from the electronic device, the server may identify whether the electronic device is a device subscribing to/registered in the safety message communication service based on the ID (and/or group ID) of the electronic device, and/or application ID contained in the authentication request message. Upon identifying that the electronic device is a device subscribing to/registered in the safety message communication service, the server may identify the communication coverage (e.g., long/medium/short) where the electronic device may announce or monitor and/or the PLMN where the electronic device may perform proximity-based service direct discovery based on the application ID contained in the authentication request message. Further, the server may identify at least one key value and/or encryption-related algorithm to guarantee the integrity of the safety message corresponding to the safety message type (e.g., BSMP) supported by the electronic device based on the UE safety message capability contained in the authentication request message. Then, the server may transmit an authentication permission message containing the authentication information identified corresponding to the authentication request message to the electronic device. In other words, the electronic device may receive the authentication permission message to permit authentication on the safety message communication service from the server. The authentication permission message may include, e.g., information about the PLMN where the electronic device may perform proximity-based service direct discovery, the communication coverage (e.g., long/medium/short) where the electronic device may announce or monitor, and at least one key value and/or encryption-related algorithm to guarantee the integrity of the safety message corresponding to the safety message type (e.g., BSMP) supported by the electronic device.

Meanwhile, upon identifying that the electronic device is a device not subscribing to/registered in the safety message communication service, the server may transmit a service authentication failure message and/or service subscription/registration application message to the electronic device. In other words, the electronic device may identify whether the electronic device is authenticated for the safety message communication service by receiving the service authentication failure message and/or service subscription/registration application message from the server.

In operation 530, e.g., when the authentication on the safety message communication service is complete, the electronic device may allocate a resource for performing the inter-UE safety message communication service. For example, the electronic device may send a request for using or releasing a resource pool for performing the safety message communication service to the base station (e.g., E-UTRAN) and receive a response to the request from the base station, and allocate the resource for performing the safety message communication service.

Figure 6:
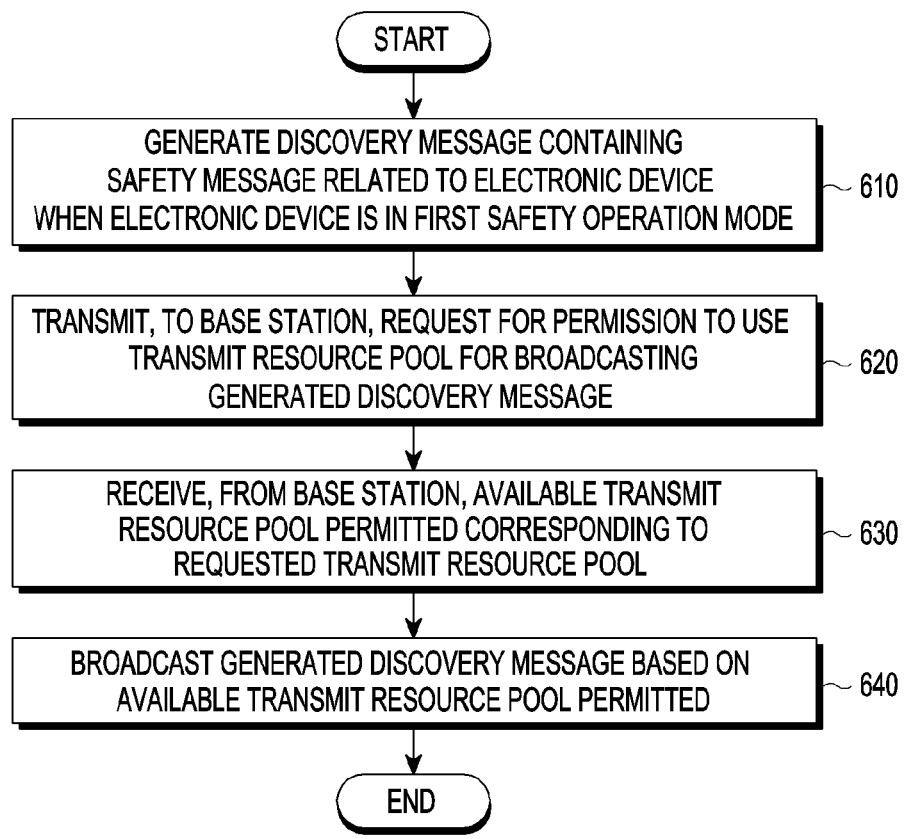
FIG. 6 is a flowchart illustrating a method of providing, by an electronic device, a V2P service based on proximity-based service direct discovery according to various embodiments.

FIG. 6 is a flowchart illustrating a method of providing, by an electronic device, a V2P service based on proximity-based service direct discovery according to various embodiments. FIG. 6 is a view illustrating in greater detail the method of broadcasting a safety message (e.g., BSMP) among operations of operation 430 shown in FIG. 4, and the method may include operations 610 to 640. The method of providing the V2P service (e.g., safety message communication) by the electronic device may be performed by any one of an electronic device (e.g., the electronic device 301) or a processor (e.g., the processor 120 or the processor 340) of the electronic device.

In operation 610, e.g., when the safety operation mode of the electronic device is a first safety operation mode, the electronic device may generate a discovery message containing a safety message related to the electronic device. For example, in the first safety operation mode, the electronic device may add a predetermined value of bit to indicate the safety message to the "reserved" field of the message type field in the existing discovery message format. For example, a total of eight bits may be allocated to the message type field in the existing discovery message format, and the message type field may include, e.g., a field (2 bits) to indicate the discovery type value, a field (2 bits) to indicate the discovery model value, and a reserved field (4 bits) to indicate a reserved space for additionally defining a predetermined value. The electronic device may add the value to indicate the safety message to the reserved field (4 bits) to add the safety message related to the safety of the electronic device to the existing discovery message format. As the value to indicate the safety message, e.g., "0001" may be added to the reserved field. That is, when the reserved field contains "0001," the discovery message may be interpreted as containing the safety message. Further, a code to indicate the type of the discovery message may be stored in the application code (e.g., ProSe application code) field of the existing discovery message format. For example, a total of 18 bits may be allocated to the application code field and, among them, the 160-bit resource in total, except for 24 bits related to identification information (ID) (e.g., mobile country code (MCC) or mobile network code (MNC), may be provided. The electronic device may generate the discovery message by including at least one parameter related to the safety message in at least part of the resource of 160 bits in total of the application code field.

In operation 620, e.g., the electronic device may send a request for a permission to use a transmit resource pool for broadcasting the generated discovery message to the base station (e.g., E-UTRAN). For example, the electronic device may transmit a request for using at least one resource pool for broadcasting the safety message-containing discovery message via the PSDCH to the base station. For example, the electronic device may transfer a use request message for up to four resource pools to the LTE uplink resource, thereby transmitting it to the base station. The use request message may contain information for using the resource pool for performing the safety message communication service, and the information may be, e.g., sidelink UE information. The sidelink UE information may include, e.g., a field (e.g., discTxResourceReq) to indicate the request for using the resource pool.

In operation 630, e.g., the electronic device may receive a permitted available transmit resource pool corresponding to the requested transmit resource pool, from the base station. For example, the electronic device may receive a use permission message responsive to the use request message for the transmit resource pool from the base station. The electronic device may allocate an available resource pool corresponding to the electronic device based on the use permission message.

For example, the use permission message received from the base station may be an SIB 19 message, and the use permission message may include the number of resources available, transmission period, available transmission frequency band and scheme of using available resources. For example, in response to the request to use the transmit resource pool, the number of available resource pools may be allocated in the electronic device. For example, the electronic device may receive an allocation of at least one available resource pool among up to four resource pools as requested, based on the communication state of the base station. The transmission period may be set depending on the number of resource pools available. For example, in a case where one of the four resource pools requested is allocated in the electronic device as the available resource pool permitted by the base station in the first safety operation mode, the broadcastable minimum period of the electronic device may be 320 ms which is the same as default. Further, in a case where all of the four resource pools requested are allocated in the electronic device as the available resource pools permitted to use by the base station in the first safety operation mode, the broadcastable minimum period of the electronic device may be reduced to 80 ms which results from dividing 320 ms, which is set as default, by 4. That is, when the electronic device uses the resource pools permitted to use to the maximum, i.e., all of the four resource pools requested, the broadcasting period of the electronic device may be 80 ms. The available transmission frequency band may be an LTE frequency band and may include a plurality of bands. The scheme of using the available resource pool may include any one of, e.g., a first resource pool use scheme or a second resource pool use scheme. The first resource pool use scheme may be a type 1 scheme in which the electronic device may randomly select one from among at least one resource permitted to use. The second resource pool use scheme may be a type 2B scheme in which a resource to be used among at least one resource permitted to use is determined by the base station.

Further, the use permission message may further include priority information about the available transmission frequency band. For example, in a case where there are a plurality of available frequency bands, the electronic device may select the transmission frequency band depending on the priority information.

In operation 640, e.g., the electronic device may broadcast the generated discovery message based on the available transmit resource pool permitted. For example, the electronic device may broadcast the safety message-containing discovery message depending on the available resource pool count, transmission period, transmission frequency band, and use scheme contained in the use permission message received from the base station.

Figure 7:
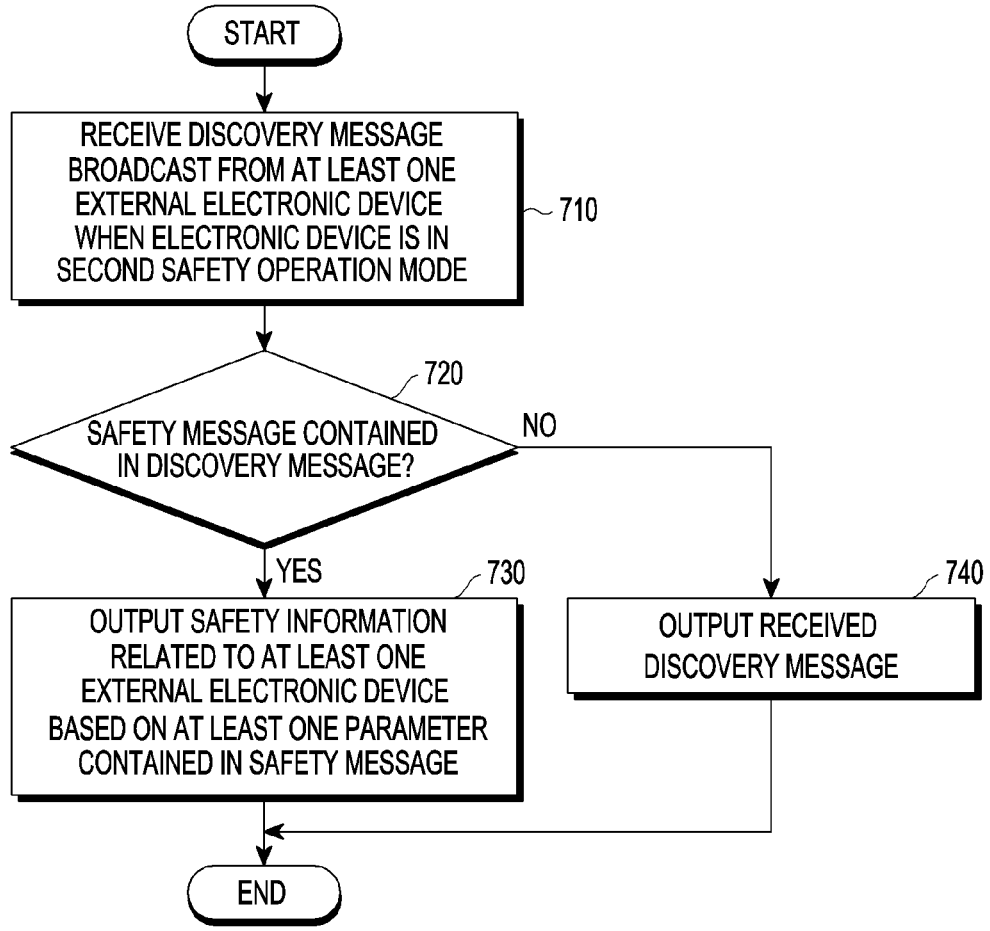
FIG. 7 is a flowchart illustrating a method of providing, by an electronic device, a V2P service based on proximity-based service direct discovery according to various embodiments.

FIG. 7 is a flowchart illustrating a method of providing, by an electronic device, a V2P service based on proximity-based service direct discovery according to various embodiments. FIG. 7 is a view illustrating in greater detail the method of receiving a safety message from at least one external electronic device among the operations of operation 430 shown in FIG. 4, and the method may include operations 710 to 740. The method of providing the V2P service (e.g., safety message communication) by the electronic device may be performed by any one of an electronic device (e.g., the electronic device 301) or a processor (e.g., the processor 120 or the processor 340) of the electronic device.

In operation 710, e.g., when the safety operation mode of the electronic device is the second safety operation mode, the electronic device may receive a discovery message broadcast from at least one external electronic device.

In operation 720, e.g., the electronic device may identify whether the received discovery message contains the safety message related to the external electronic device. For example, the electronic device may identify whether the message type field in the discovery message format received contains a field value indicating the safety message. For example, when the reserved field, indicating the safety message, of the message type field in the received discovery message format contains a value (e.g., "0001"), the electronic device may determine that the received discovery message contains the safety message and, unless the message type field in the received discovery message format contains a field value (e.g., "0001") indicating the safety message, the electronic device may determine that the received discovery message lacks the safety message. In operation 720, upon identifying that the received discovery message contains the safety message, the electronic device may perform operation 730 and, upon determining that the received discovery message lacks the safety message, the electronic device may perform operation 740.

In operation 730, upon identifying that the received discovery message contains the safety message, the electronic device may output safety information related to the at least one external electronic device based on at least one parameter contained in the safety message. For example, upon identifying that the received discovery message contains the safety message, the electronic device may examine all of the data fields allocated in the ProSe application code field in the received discovery message format and detect at least one parameter contained in the received safety message.

According to an embodiment, the at least one parameter detected from the safety message may include at least one of identification information (ID) (e.g., DSRCmsgID) to indicate what safety message set the safety message is included in, a number (e.g., MsgCount) assigned to data streams with the same identification information (e.g., DSRCmsgID) from the same sender, a random ID (e.g., TemporaryID) of device which is periodically varied, time (e.g., 1 minute is represented in milliseconds) (e.g., DSecond), latitude (e.g., Latitude), longitude (e.g., Longitude), terrestrial height (e.g., Elevation), position accuracy (e.g., PositionAccuracy), or speed (e.g., Speed). The at least one parameter is not limited thereto and may rather include various types of parameters related to the external electronic device (e.g., pedestrian type external electronic device).

Further, the electronic device may output, via the output device (e.g., the display and/or speaker) of the electronic device, safety information including at least one of the identification information (ID), location, speed, or moving direction of the external electronic device, obtained based on the at least one parameter detected. The operation of outputting the safety information on the electronic device is described in greater detail with reference to FIGS. 8a to 8d.

In operation 740, e.g., upon identifying that the received discovery message lacks the safety message, the electronic device may compare the code value contained in the ProSe application code field of the received discovery message with a pre-stored codebook and identify what kind of message the discovery message is. For example, the codebook may include preset code values corresponding to various types of discovery messages. For example, the types of discovery messages may include advertisements or coupons. For example, in a case where the type of the received discovery message is an advertisement, the received discovery message may include a code value corresponding to the advertisement, and the electronic device may compare the code contained in the received discovery message with the pre-stored codebook and identify a matching code, thereby identifying that the type of the discovery message is an advertisement. The electronic device may output on the display of the electronic device, or store in the memory of the electronic device, the identified advertisement. Likewise, in a case where the type of the received discovery message is a coupon, the received discovery message may include a code value corresponding to the coupon, and the electronic device may compare the code contained in the received discovery message with the pre-stored codebook and identify a matching code, thereby identify that the type of the discovery message is a coupon. The electronic device may output on the display of the electronic device, or store in the memory of the electronic device, the identified coupon.

FIGS. 8a to 8e are views illustrating example user interfaces outputting, by an electronic device, safety information related to at least one external electronic device based on a safety message received from at least one external electronic device according to various embodiments.

Referring to FIGS. 8a to 8e, the electronic device may include, on a display screen 800, at least one of a first region 810 to display whether a V2P application is executed, a second region 820 to display detailed information about the electronic device or at least one external electronic device, or a third region 830 to display safety information related to the electronic device and the at least one external electronic device. The first region 810 may display that a safety message communication service is performed, as a V2P service, when a safety application related to the safety message communication service is executed. The first region 810 may also display that the safety message communication service is stopped when the safety application stops. The second region 820 may display detailed information (e.g., location, speed, and/or moving direction) related to the electronic device. The second region 820 may also display detailed information (e.g., location, speed, and/or moving speed) related to the external electronic device selected by the user or detected to be in danger. The third region 830 may display safety information related to the electronic device and the at least one external electronic device (e.g., the external electronic device of which the user device type is a pedestrian type).

Figure 8A:
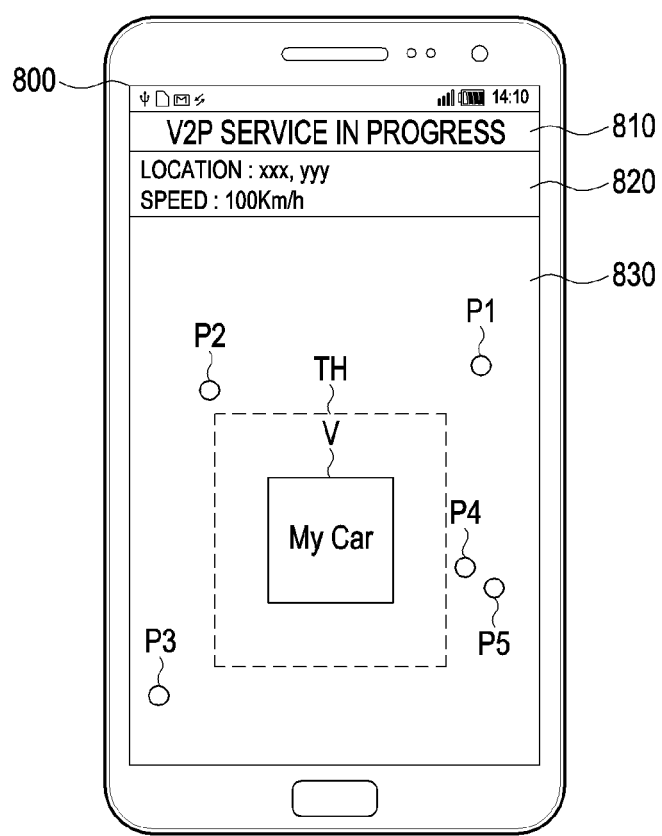
FIGS. 8a to 8e are views illustrating example user interfaces outputting, by an electronic device, safety information related to at least one external electronic device based on a safety message received from at least one external electronic device according to various embodiments.

Referring to FIG. 8*a*, an indication V corresponding to the location of the electronic device and indications P1 to P5 corresponding to at least one external electronic device may be displayed on the third region 830. For example, the electronic device may identify the location and speed of the electronic device from a positioning device (e.g., a GPS device) of the electronic device. Further, the electronic device may calculate the location of the external electronic device based on latitude, longitude, or location accuracy among the at least one parameter included in the received safety message. From this, the electronic device may display, on the display of the electronic device, the indications V or P1 to P5 corresponding to the locations of the electronic device and the at least one external electronic device. The user of the electronic device may intuitively grasp the location between the electronic device and the at least one external electronic device via the indications V or P1 to P5. Further, a safety distance range TH for the electronic device may further be displayed on the third region 830. For example, the safety distance range TH may be previously set.

Figure 8B:
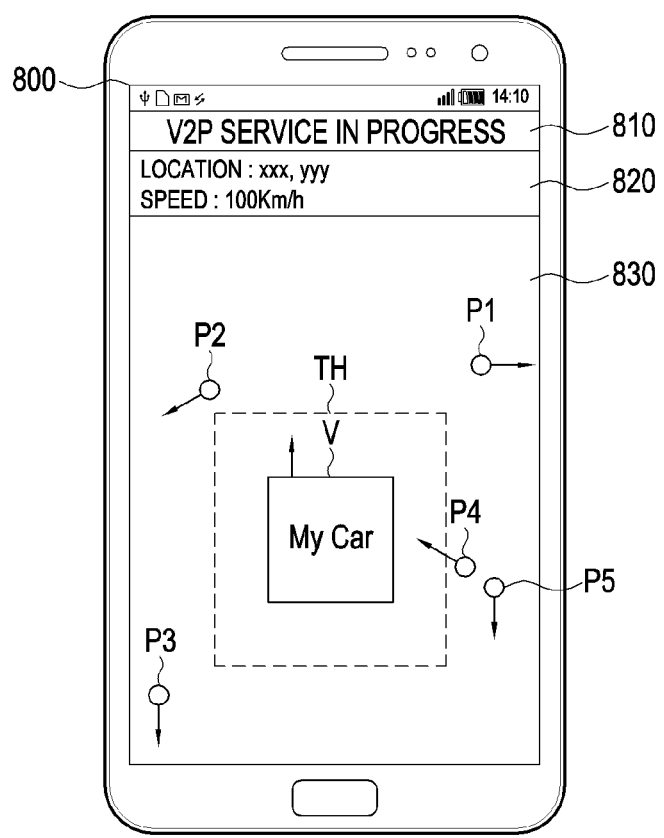

Referring to FIG. 8*b*, the third region 830 may display indications (e.g., arrows displayed corresponding to P1 to P5) for the moving directions of the external electronic devices, as well as the indications P1 to P5 corresponding to the locations of the external electronic devices. The user of the electronic device may intuitively grasp the location and moving direction between the electronic device and the at least one external electronic device through the indications. Although the indication for the moving direction of the external electronic device is shown as an arrow in FIG. 8*b*, it will be appreciated by one of ordinary skill in the art that the indication is not limited thereto and may be displayed in various manners.

Figure 8C:
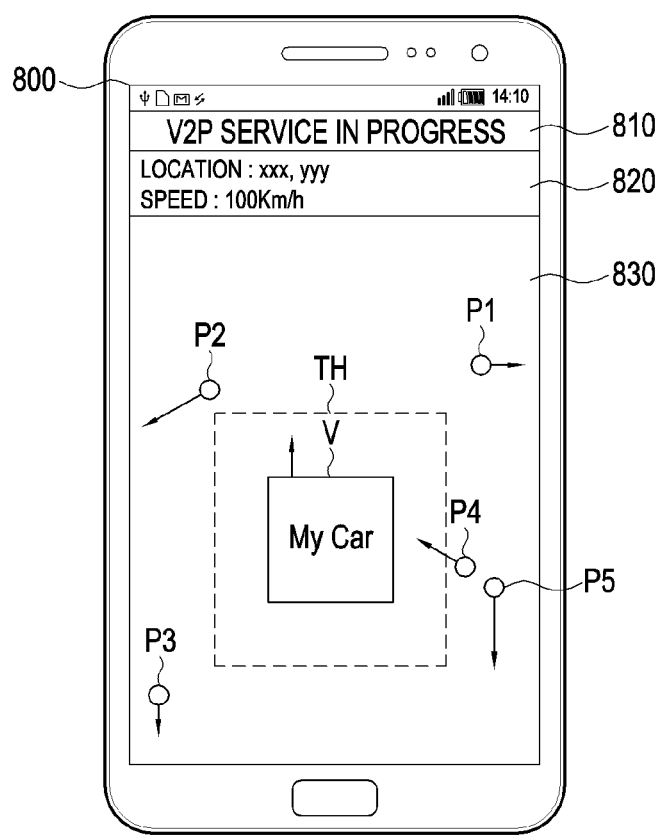

Referring to FIG. 8*c*, the third region 830 may display indications (e.g., the length of each arrow) corresponding to the speed of the external electronic devices, as well as the indications P1 to P5 corresponding to the locations of the external electronic devices and the indications (e.g., the arrows displayed corresponding to P1 to P5) for the moving directions of the external electronic devices. For example, the indication may be displayed to correspond to the length of the arrow of the electronic device or the external electronic device. For example, as the speed of the electronic device or external electronic device increases, the arrow may be displayed longer. Although the indication for the speed of the external electronic device is shown as the length of the arrow in FIG. 8*c*, it will be appreciated by one of ordinary skill in the art that the indication is not limited thereto and may be displayed in various manners.

Figure 8D:
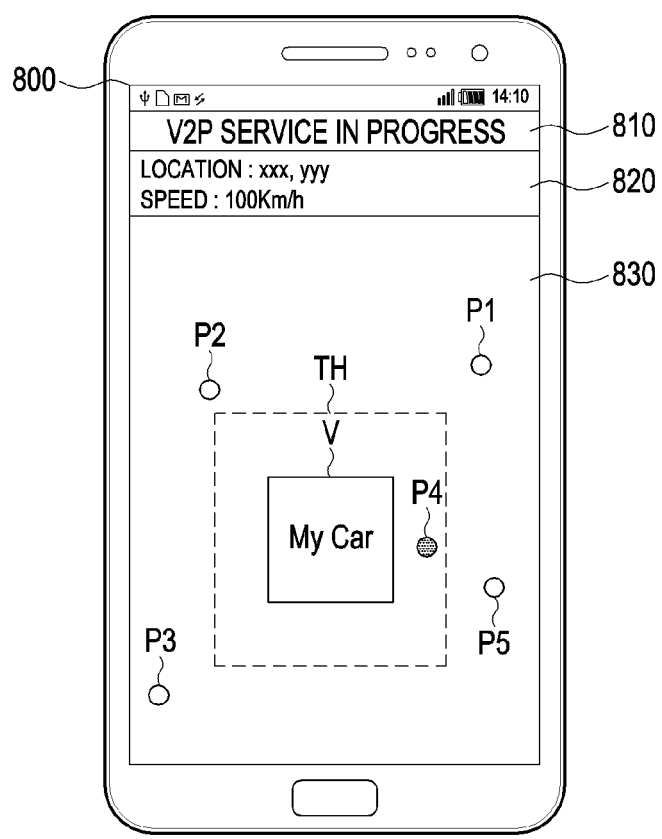

Referring to FIG. 8*d*, the third region 830 may display an indication (e.g., P4) of at least one external electronic device that has entered the safety distance range TH for the electronic device. For example, the indication (e.g., P4) of at least one external electronic device which has entered the safety distance range TH may be displayed in a different color from the other external electronic devices which do not enter the safety distance range TH or may be displayed in animation, e.g., flickering, on the display of the electronic device. The user of the electronic device may intuitively recognize the presence of at least one external electronic device which enters the safety distance range TH of the electronic device from display in a different color or animation, such as flickering.

Figure 8E:
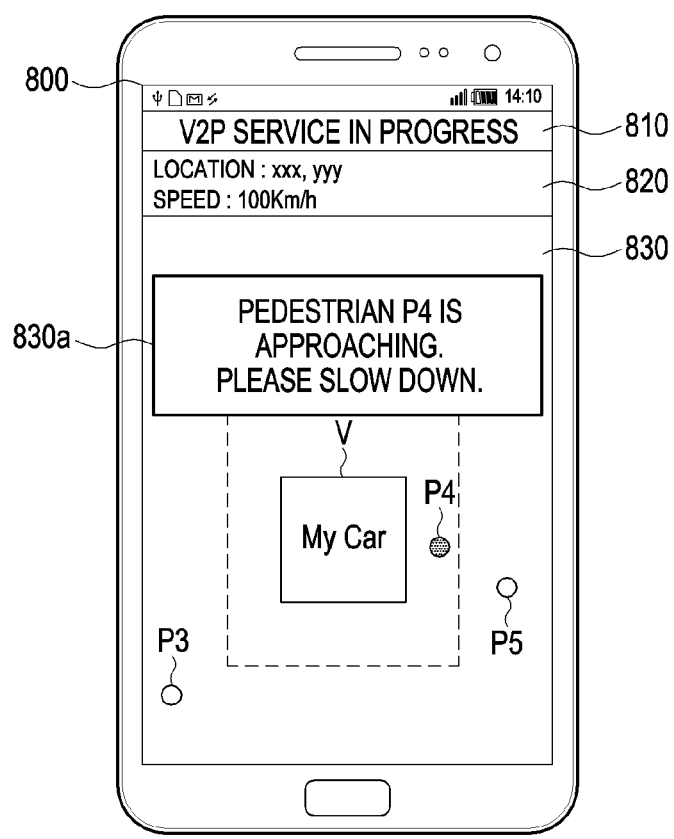

Referring to FIG. 8*e*, the third region 830 may display a notification message (e.g., "Pedestrian P4 is approaching. Please slow down") to indicate that the at least one external electronic device has entered the safety distance range TH, as well as the indication (e.g., P4) of the at least one external electronic device that has entered the safety distance range TH for the electronic device. The notification message may be displayed on the display of the electronic device, e.g., in the form of a popup message.

Further, according to an embodiment, although not shown, when at least one external electronic device enters the safety distance range TH for the electronic device, the electronic device may indicate the same not only in a visual manner as shown in FIGS. 8*d* and 8*e* but also in an audible manner. For example, when at least one external electronic device enters the safety distance range TH, the electronic device may output an alert sound or a voice message (e.g., "Pedestrian P4 is approaching. Please slow down.") via the output device (e.g., the speaker 334) of the electronic device.

Although it is shown in FIGS. 8*a* to 8*e* that the electronic device is a mobile phone, such as a smartphone, in a case where the electronic device is operated as a UE monitoring UE in the second safety operation mode (e.g., vehicle mode), the electronic device is not limited thereto. For example, the electronic device may be a display-equipped component (e.g., a navigation device) which interworks with a communication device in the vehicle. For example, the safety information may be displayed in a UI as shown in FIGS. 8*a* to 8*e* via the display screen of the navigation device.

According to an embodiment, a method of providing a safety message communication service by an electronic device configured to provide a vehicle-to-pedestrian (V2P) service based on proximity-based service direct discovery may comprise broadcasting a safety message related to the electronic device via a communication circuit of the electronic device in a first safety operation mode, and receiving a safety message broadcast from at least one external electronic device via the communication circuit of the electronic device in a second safety operation mode different from the first safety operation mode.

According to an embodiment, the method may further comprise, when a designated condition is met, configuring the electronic device based on a UE safety profile of the electronic device. The designated condition may include at least one of a turn-on of the electronic device, reception of a discovery message from an RSU, communication connection with a designated cell area, a change in a cell area where the electronic device is in communication connection, entry to a designated area, or exit from the designated area.

According to an embodiment, broadcasting the safety message may comprise generating a discovery message containing the safety message related to the electronic device in the first safety operation mode, transmitting a request for a transmit resource pool to a base station, and broadcasting the generated discovery message based on the transmit resource pool received from the base station.

According to an embodiment, receiving the safety message may comprise receiving a discovery message broadcast from at least one external electronic device in the second safety operation mode, identifying whether the received discovery message contains a safety message related to a corresponding external electronic device, and when it is identified that the received discovery message contains the safety message, outputting safety information related to the at least one external electronic device based on at least one parameter contained in the identified safety message.

According to an embodiment, the at least one parameter may include at least one of identification information (ID), location, speed, or moving direction of the corresponding external electronic device.

According to an embodiment, outputting the safety information related to the at least one external device may include displaying, on a display unit of the electronic device, locations of the electronic device and the at least one external electronic device based on the at least one parameter contained in the identified safety message.

According to an embodiment, outputting the safety information related to the at least one external device may comprise calculating a distance between the at least one external electronic device and the electronic device based on at least one parameter contained in the identified safety message and, when the calculated distance is equal to or less than a threshold, transmitting a notification to the electronic device.

According to an embodiment, transmitting the notification to the electronic device may comprise displaying the notification on a display of the electronic device.

According to an embodiment, transmitting the notification to the electronic device may comprise outputting the notification, as an alert sound or a voice message (e.g., a warning comment), via a speaker of the electronic device.

Figure 9:
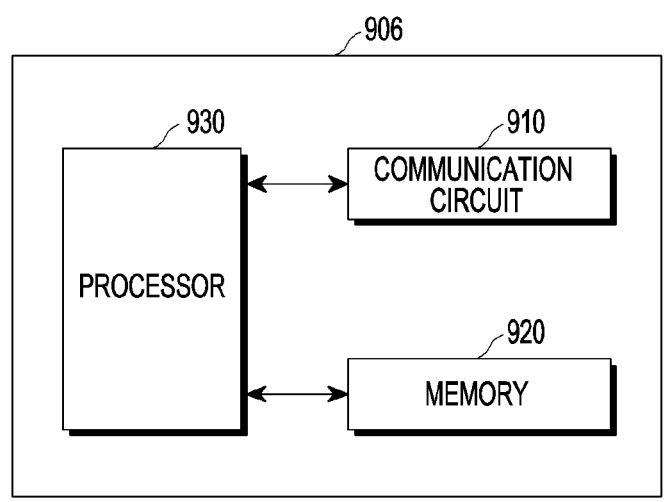
FIG. 9 is a block diagram illustrating a base station server according to various embodiments.

FIG. 9 is a block diagram illustrating a base station server according to various embodiments.

Referring to FIG. 9, according to various embodiments, a base station server 906 may include at least one of a communication circuit 910, a memory 920, or a processor 930. The server 906 may include the whole or part of the server 106 of FIG. 1 or the server (e.g., ProSe function) of FIG. 2. The server 906 may include the whole or part of a server of a base station (e.g., an eNB).

The communication circuit 910 may perform communication connection with at least one electronic device (e.g., the devices (UE A, UE B) shown in FIG. 2 or the electronic device 301 shown in FIG. 3) and may transmit or receive predetermined information to/from the at least one electronic device. The communication circuit 910 may also be termed a communication unit or communication module, include a communication unit or communication module as part thereof, or may configure a communication unit or communication module.

The communication circuit 910 may provide data based on short-range communication. For example, the communication circuit 910 may perform communication connection with the at least one electronic device connected to a first network via the communication circuit 910. For example, the communication circuit 910 may include cellular communication using at least one of LTE, LTE-A, CDMA, WCDMA, UMTS, WiBro, or GSM.

The memory 920 may include the whole or part of the memory 130 of FIG. 1. For example, the memory 920 may store at least one service that the server 906 may support.

The memory 920 may store subscription/registration information about at least one electronic device (e.g., the electronic device 301) to receive the at least one service in the server 906. The memory 920 may store key values generated corresponding to at least one key value corresponding to at least one service requested from the at least one electronic device (e.g., the electronic device 301). The memory 920 may store a plurality of encryption algorithms capable of protecting data (e.g., safety message (e.g., BSMP)) corresponding to the at least one service (e.g., safety message communication service as V2P service). For example, the encryption algorithms may include an integrity guarantee related encryption algorithm to guarantee the integrity of the safety message (e.g., BSMP).

The processor 930 may overall control the server 906. The processor 930 may support inter-UE direct discovery service based on proximity-based service direct discovery. For example, the processor 930 may perform service authentication on the service with at least one electronic device (e.g., the electronic device 301) to receive the proximity-based service direct discovery-based inter-UE direct discovery service. For example, the processor 930 may receive a request signal to request authentication on the proximity-based service direct discovery-based inter-UE direct communication service (e.g., safety message communication service as a V2P service) from the electronic device 301. The request signal may include at least one of, e.g., the identification information (ID) (and/or the ID of the group where the electronic device 301 belongs) of the electronic device 301 and the UE safety message capabilities of the electronic device 301. The processor 930 may perform authentication on the safety message communication service in response to the request signal and send a response signal to allow or reject the authentication to the electronic device 301. For example, in response to the authentication request signal for the safety message communication service, the processor 930 may identify whether the electronic device 301 is a device which has completed the subscription/registration in the safety message communication service. For example, the processor 930 may load the subscription/registration information about the electronic device 301 from the memory 920 and identify whether the electronic device 301 has subscribed or been registered. In a case where the memory 920 lacks the subscription/registration information about the electronic device 301, the processor 930 may send a request for subscription/registration information to, and receive from, a home subscriber server (HSS) in a home public and land mobile network (HPLMN). Further, in a case where the processor 930 is unable to receive the subscription/registration information about the electronic device 301 from the HSS in the HPLMN, the processor 930 may send a request for the subscription/registration information about the electronic device 301 to, and receive from, servers (e.g., ProSe function) in other PLMNs.

When the subscription/registration of the electronic device 301 is completely identified, the processor 930 may transmit a response signal containing a permission to authenticate the safety message communication service of the electronic device 301 to the electronic device 301. When the electronic device 301 receives the response signal containing the authentication information indicating to permit authentication from the server 906, the service authentication on the safety message communication service may be complete and the electronic device 301 may perform the safety message communication service. Unless the processor 930 is able to identify the subscription/registration information about the electronic device 301, the processor 930 may transmit a response signal containing the authentication information indicating that authentication on the safety message communication service is not permitted to the electronic device 301. In this case, the processor 930 may add a message (e.g., a service authentication failure message or service subscription/registration application message) to indicate that the electronic device 301 has not subscribed/registered in the safety message communication service to the response signal containing authentication failure.

When the service authentication is complete, the processor 930 may receive a request for at least one key value corresponding to the safety message for transmission and reception of the safety message guaranteed for inter-UE integrity for safety message communication, from the electronic device 301. Upon receiving the request for at least one key value, the processor 930 may generate at least one key value for guaranteeing the integrity of the safety message for providing a V2P service (e.g., safety message communication service) based on proximity-based service direct discovery to the electronic device 301.

The processor 930 may transmit a response signal containing the at least one key value generated to the electronic device 301. Further, the response signal may further include at least one of an expiry time corresponding to the at least one key value and an encryption algorithm (e.g., integrity guarantee-related algorithm) identifier (ID) or group member identifier (ID) for protecting the safety message. Further, the response signal may further include PLMN information capable of performing proximity-based service direct discovery and the communication range (e.g., long/medium/short) where the electronic device may announce or monitor.

Figure 10:
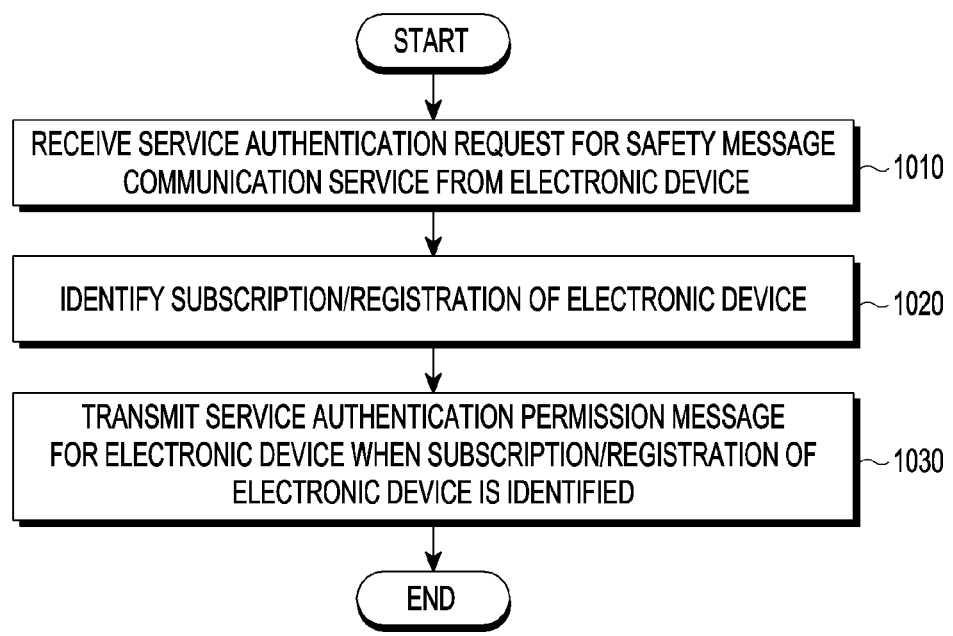
FIG. 10 is a flowchart illustrating a method of providing, in a base station server, a V2P communication service based on proximity-based service direct discovery according to various embodiments.

FIG. 10 is a flowchart illustrating a method of providing, in a base station server, a V2P communication service based on proximity-based service direct discovery according to various embodiments. The method may include operations 1010 to 1030. The method of providing the V2P communication service (e.g., safety message communication) by the server may be performed by any one of a server (e.g., the server 906) or a processor (e.g., the processor 930) of the server.

In operation 1010, e.g., the server may perform service authentication on a safety message communication service between the electronic device (e.g., the electronic device 301) and at least one external electronic device, with at least one electronic device. For example, the server may receive a request signal to request authentication on the proximity-based service direct discovery-based inter-UE direct communication service (e.g., safety message communication service as a V2P service) that the electronic device supports, based on the UE safety message capability of the electronic device received from the at least one electronic device (e.g., the electronic device 301).

The server may identify whether the electronic device has subscribed or been registered in the safety message communication service based on the received ID (and/or group ID) of the electronic device, in response to the request signal. When it is identified whether the electronic device has subscribed or been registered, the server may transmit a response signal containing a permission to authenticate the safety message communication service of the electronic device to the electronic device. Further, unless it is identified whether the electronic device has subscribed or been registered, the server may transmit a response signal containing a failure in authentication on the safety message communication service of the electronic device to the electronic device. When the server transmits a response signal containing a permission or failure in authentication to the electronic device in response to the authentication request signal for the safety message communication service, the server may complete the service authentication on the safety message communication service.

In operation 1020, e.g., upon receiving a request signal to request authentication on the safety message communication service from the electronic device, the server may load subscription/registration information about the electronic device from the memory of the server and identify whether the electronic device has subscribed to or been registered in the safety message communication service. In a case where the memory lacks the subscription/registration information about the electronic device, the server may send a request for subscription/registration information about the electronic device to, and receive from, the HSS in the HPLMN. Further, in a case where the server is unable to receive the subscription/registration information about the electronic device from the HSS in the HPLMN, the server may send a request for the subscription/registration information about the electronic device to, and receive from, the ProSe functions in other PLMNs.

In operation 1030, e.g., when the subscription/registration of the electronic device is identified, the server may generate, and transmit to the electronic device, a response signal containing authentication information indicating to permit the electronic device for service authentication.

Further, unless the server is able to identify the subscription/registration information about the electronic device, the server may transmit a response signal containing the authentication information indicating that authentication on the safety message communication service is not permitted to the electronic device. In this case, the server may add a message (e.g., a service authentication failure message or service subscription/registration application message) to indicate that the electronic device has not subscribed/registered in the safety message communication service to the response signal containing authentication failure.

Further, when the service authentication is complete, the server may receive a request for at least one key value corresponding to the safety message for transmission and reception of the safety message guaranteed for inter-UE integrity for safety message communication, from the electronic device. Upon receiving the request for at least one key value, the server may generate at least one key value for guaranteeing the integrity of the safety message for providing a V2P service (e.g., safety message communication service) based on proximity-based service direct discovery to the electronic device.

The server may transmit a response signal containing the at least one key value generated to the electronic device. Further, the response signal may further include at least one of an expiry time corresponding to the at least one key value and an encryption algorithm (e.g., integrity guarantee-related algorithm) identifier (ID) or group member identifier (ID) for protecting the safety message. Further, the response signal may further include PLMN information capable of performing proximity-based service direct discovery and the communication range (e.g., long/medium/short) where the electronic device may announce or monitor.

As used herein, the term 'module' may refer to a unit including one of hardware, software, and firmware, or a combination thereof. The term 'module' may be interchangeably used with, e.g., a unit, logic, logical block, component, or circuit. The module may be a minimum unit or part of an integrated component. The module may be a minimum unit or part of performing one or more functions.

The module may be implemented mechanically or electronically. For example, the module may include at least one of application specific integrated circuit (ASIC) chips, field programmable gate arrays (FPGAs), or programmable-logic devices that perform some operations, which have already been known or will be developed in the future.

According to an embodiment of the present invention, at least a part of the device (e.g., modules or their functions) or method (e.g., operations) may be implemented as instructions stored in a computer-readable storage medium e.g., in the form of a programming circuit. The instructions, when executed by a processor (e.g., the processor 120), may enable the processor to carry out a corresponding function. The computer-readable storage medium may be, e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, or the like. Examples of the program instructions may include not only machine language codes but also high-level language codes which are executable by various computing means using an interpreter. The aforementioned hardware devices may be configured to operate as one or more software modules to carry out exemplary embodiments of the disclosure, and vice versa.

Circuits or programming circuits in accordance with various embodiments of the present disclosure may include at least one or more of the aforementioned components, omit some of them, or further include other additional components. Operations performed by circuits, programming circuits or other components in accordance with various embodiments of the present disclosure may be carried out sequentially, simultaneously, repeatedly, or heuristically. Furthermore, some of the operations may be performed in a different order, or omitted, or include other additional operation(s).

According to various embodiments, there is provided a storage medium storing commands configured to, when executed by at least one processor, enable the at least one processor to perform at least one operation that may comprise, by an electronic device configured to provide a V2P service based on proximity-based service direct discovery, broadcasting a safety message related to the electronic device via a communication circuit of the electronic device in a first safety operation mode and receiving a safety message broadcast from at least one external electronic device via the communication circuit of the electronic device in a second safety operation mode different from the first safety operation mode.

The embodiments disclosed herein are proposed for description and understanding of the disclosed technology and does not limit the scope of the present invention. Accordingly, the scope of the present invention should be interpreted as including all changes or various embodiments based on the technical spirit of the present invention.

The invention claimed is:

1. An electronic device, comprising:
   a communication circuit; and
   a processor configured to broadcast a safety message related to the electronic device via the communication circuit in a first safety operation mode, and receive a safety message broadcast from at least one external electronic device in a second safety operation mode different from the first safety operation mode,
   wherein the processor is further configured to:
   transmit to a base station, a request message including information to request a permission to use a plurality of resource pools for proximity-based service (Prose) direct discovery,
   select from among the plurality of resource pools, at least one resource pool based on a response message including the permission to use the plurality of resource pools received from the base station in response to the request message, and
   broadcast a discovery message including the safety message related to the electronic device by using the selected at least one resource pool; and
   wherein the information to request the permission to use the plurality of resource pools is sidelink user equipment (UE) information.

2. The electronic device of claim 1, wherein the processor is further configured to, when a designated condition is met, configure the electronic device based on a UE safety profile of the electronic device, and
   wherein the designated condition includes at least one of a turn-on of the electronic device, reception of a discovery message from a road side unit (RSU), communication connection with a designated cell area, a change in a cell area where the electronic device is in communication connection, entry to a designated area, or exit from the designated area.

3. The electronic device of claim 1, wherein a type of the safety message is a basic safety message for pedestrian (BSMP).

4. The electronic device of claim 1, wherein the response message includes a period of broadcasting of the safety message included in the discovery message.

5. The electronic device of claim 1, wherein the processor is configured to:
   receive a discovery message broadcast from the at least one external electronic device in the second safety operation mode,
   identify whether the received discovery message includes a safety message related to the at least one external electronic device, and
   when it is identified that the received discovery message includes the safety message, output safety information related to the at least one external electronic device based on at least one parameter included in the identified safety message.

6. The electronic device of claim 5, wherein the safety information related to the at least one external electronic device obtained based on the at least one parameter includes an identification information (ID), a location, and speed of a corresponding external electronic device.

7. The electronic device of claim 5, wherein the processor is configured to display, on a display unit of the electronic device, locations of the electronic device and the at least one external electronic device based on the at least one parameter included in the identified safety message.

8. The electronic device of claim 5, wherein the processor is configured to:
   calculate a distance between the at least one external electronic device and the electronic device based on at least one parameter included in the identified safety message, and
   when the calculated distance is equal to or less than a threshold, transmit a notification to the electronic device.

9. The electronic device of claim 8, wherein the processor is configured to display the notification on a display of the electronic device or output an alert sound or a voice via a speaker of the electronic device when the calculated distance is equal to or less than the threshold.

10. A method of providing a safety message communication service by an electronic device configured to provide a vehicle-to-pedestrian (V2P) service based on proximity-based service direct discovery, the method comprising:
broadcasting a safety message related to the electronic device via a communication circuit of the electronic device in a first safety operation mode; and
receiving a safety message broadcast from at least one external electronic device via the communication circuit of the electronic device in a second safety operation mode different from the first safety operation mode,
wherein broadcasting the safety message comprises:
transmitting, to a base station, a request message including information to request a permission to use a plurality of resource pools for proximity-based service (Prose) direct discovery,
selecting, from among the plurality of resource pools, at least one resource pool based on a response message including the permission to use the plurality of resource pools
received from the base station in response to the request message, and
broadcasting a discovery message including the safety message related to the electronic device by using the selected at least one resource pool; and
wherein the information to request the permission to use the plurality of resource pools is sidelink user equipment (UE) information.

11. The method of claim 10, further comprising:
when a designated condition is met, configuring the electronic device based on a UE safety profile of the electronic device,
wherein the designated condition includes at least one of a turn-on of the electronic device, reception of a discovery message from a road side unit (RSU), communication connection with a designated cell area, a change in a cell area where the electronic device is in communication connection, entry to a designated area, or exit from the designated area.

12. The method of claim 10, wherein receiving the safety message comprises:
receiving a discovery message broadcast from the at least one external electronic device in the second safety operation mode;
identifying whether the received discovery message includes a safety message related to a corresponding external electronic device; and
when it is identified that the received discovery message includes the safety message, outputting safety information related to the at least one external electronic device based on at least one parameter included in the identified safety message.

13. The electronic device of claim 1, wherein the safety message related to the electronic device is included in a ProSe application code of the discovery message.

14. The electronic device of claim 5, wherein the safety message related to the at least one external electronic device is included in a ProSe application code of the discovery message broadcast from the at least one external electronic device.

15. The method of claim 10, wherein the safety message related to the electronic device is included in a ProSe application code of the discovery message.

16. The method of claim 12, wherein the safety message related to the at least one external electronic device is included in a ProSe application code of the discovery message broadcast from the at least one external electronic device.

* * * * *